United States Patent
Tsukasaki et al.

(10) Patent No.: US 8,165,750 B2
(45) Date of Patent: Apr. 24, 2012

(54) VEHICLE MOTION CONTROL DEVICE AND METHOD

(75) Inventors: Yuichiro Tsukasaki, Tokyo (JP); Masaru Kogure, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/012,927

(22) Filed: Jan. 25, 2011

(65) Prior Publication Data

US 2011/0166738 A1      Jul. 7, 2011

Related U.S. Application Data

(62) Division of application No. 11/196,167, filed on Aug. 3, 2005, now Pat. No. 7,890,230.

(30) Foreign Application Priority Data

| | | | |
|---|---|---|---|
| Aug. 4, 2004 | (JP) | ................................ | 2004-227639 |
| Aug. 4, 2004 | (JP) | ................................ | 2004-228431 |
| Mar. 9, 2005 | (JP) | ................................ | 2005-065624 |

(51) Int. Cl.
*G06F 17/00*     (2006.01)

(52) U.S. Cl. ................ 701/37; 701/38; 701/39; 701/70; 701/72; 280/5.5; 280/5.507; 280/5.515; 180/197

(58) Field of Classification Search .................... 701/37, 701/38, 39, 70, 74, 80, 89, 90; 280/5.5, 5.507, 280/5.515, 707, 840; 180/197
See application file for complete search history.

(56) References Cited

U.S. PATENT DOCUMENTS

| | | | | |
|---|---|---|---|---|
| 6,366,841 | B1 * | 4/2002 | Ohsaku | 701/37 |
| 6,508,102 | B1 * | 1/2003 | Margolis et al. | 73/8 |
| 6,648,426 | B1 * | 11/2003 | Boettiger et al. | 303/146 |
| 6,697,728 | B2 * | 2/2004 | Kin et al. | 701/70 |
| 2006/0030974 | A1 * | 2/2006 | Tsukasaki et al. | 701/1 |

FOREIGN PATENT DOCUMENTS

| | | |
|---|---|---|
| JP | 06-099796 | 4/1994 |
| JP | 08-002274 | 1/1996 |
| JP | 11-102499 | 4/1999 |
| JP | 2000-071968 | 3/2000 |
| JP | 2002-022579 | 1/2002 |
| JP | 2002-027882 | 1/2002 |
| JP | 2002-039744 | 2/2002 |
| JP | 2003-104139 | 4/2003 |
| JP | 2003-237558 | 8/2003 |

* cited by examiner

*Primary Examiner* — Redhwan K Mawari
(74) *Attorney, Agent, or Firm* — Haynes and Boone, LLP

(57) ABSTRACT

The objective of the present invention is to provide a vehicle motion control device capable of controlling the driving force distribution to the wheels with superior stability and response while effectively utilizing the tire grip. Specifically, the present invention provides a vehicle motion control device for a vehicle, the vehicle having a plurality of wheels and a driving device for driving the wheels based on a driving force/load distribution ratio, having: a force detection unit for detecting forces that act on the wheels; a target distribution ratio calculating unit for obtaining nonlinear terms by use of a group of parameters including the forces detected by the force detection unit, and obtaining a target value of the driving force/load distribution ratio so as to minimize the nonlinear terms, the nonlinear terms being included in elements of a system matrix of equations of state that describe a state of motion of the vehicle; and a driving device control unit for controlling the driving device based on the target value of the driving force/load distribution ratio.

3 Claims, 15 Drawing Sheets

Divergent

Stable

Stable

VEHICLE MOTION CONTROL DEVICE AND METHOD

CROSS REFERENCE TO RELATED APPLICATIONS

This application is a divisional of copending U.S. patent application Ser. No. 11/196,167 filed on Aug. 3, 2005. This application further claims priority under 35 U.S.C. 119 based upon Japanese Patent Application Serial No. 2004-227639, filed on Aug. 4, 2004, Japanese Patent Application Serial No. 2004-228431, filed on Aug. 4, 2004, and Japanese Patent Application Serial No. 2005-065624, filed on Mar. 9, 2005. The entire disclosures of the aforesaid applications are incorporated herein by reference.

BACKGROUND OF THE INVENTION

1. Field of the Invention

The present invention relates to vehicle motion control devices and methods, and, in particular, to devices and methods for controlling the motion of a vehicle through controlling the distribution ratio of the driving force based on the forces that act on the wheels.

2. Description of the Related Art

Conventionally, there are known technologies for controlling the state of motion of a vehicle through controlling the distribution ratio of the driving force between the front and rear wheels and/or between the left and right wheels.

The main objective of these technologies is to improve steering by controlling the driving force distribution ratio to achieve an appropriate state of motion of the vehicle under certain driving conditions such as cornering. Japanese Patent Publication 3132190 disclosed a device for controlling the state of motion of a vehicle by means of a wheel frictional force utilization ratio. In the device, the wheel frictional force utilization ratios are calculated for the respective wheels, which are then controlled so that the wheel frictional force utilization ratios become close to the respective target values.

Japanese Kokai Laid-open Publication H 11-102499 disclosed a method wherein the state of motion of a vehicle is controlled by utilizing the fact that the vehicle behavior is affected by the elements in the system matrix of equations of state that describe the state of motion of the vehicle.

However, the main focus of the technologies described above is the effective utilization of the driving force; thus, issues such as stability and response are not fully considered. In particular, if the wheel friction utilization ratio is controlled to the limit during spinning, the control mechanism would rely heavily on the grip of the tires on the outer wheels, leading to problems such as the loss of stability against disturbances due to, for example, a sudden change in the friction coefficient with the road surface.

In other words, in the technologies described above, the nonlinear elements of the vehicle motion are not properly taken into consideration in controlling the vehicle behavior; as a result, there is a possibility that steering stability gets degraded.

The entire disclosures of Japanese Patent Publication 3132190 and Japanese Kokai Laid-open Publication H 11-102499 are incorporated herein by reference.

SUMMARY OF THE INVENTION

In view of the above circumstances, the objective of the present invention is to provide a vehicle motion control device capable of controlling the driving force distribution to the wheels with superior stability and response while effectively utilizing the tire grip.

According to one aspect of the present invention, there is provided a vehicle motion control device for a vehicle, the vehicle having a plurality of wheels and a driving device for driving the wheels based on a driving force/load distribution ratio, comprising: a force detection unit for detecting forces that act on the wheels; a target distribution ratio calculating unit for obtaining nonlinear terms by use of a group of parameters including the forces detected by the force detection unit, and obtaining a target value of the driving force/load distribution ratio so as to minimize the nonlinear terms, the nonlinear terms being included in elements of a system matrix of equations of state that describe a state of motion of the vehicle; and a driving device control unit for controlling the driving device based on the target value of the driving force/load distribution ratio.

In addition, there is provided a vehicle motion control method for controlling motion of a vehicle according to the above aspect of the present invention.

According to another aspect of the present invention, there is provided a vehicle motion control device for a vehicle, the vehicle having a plurality of wheels and a driving device for driving the wheels based on a driving force/load distribution ratio, comprising: a calculating unit for obtaining, based on equations of state that describe a state of motion of the vehicle, a divergence value, which is a characteristic value that represents a tendency of vectors in a vector field, the vector field describing a state surface with axes representing state variables for the state of motion of the vehicle; a setting unit for setting a target value of the driving force/load distribution ratio for the individual wheels, such that the divergence value becomes less than a current value of the divergence value or the divergence value becomes less than or equal to zero; and a driving device control unit for controlling the driving device based on the target driving force/load distribution ratio.

In addition, there is provided a vehicle motion control method for controlling motion of a vehicle according to the above another aspect of the present invention.

According to yet another aspect of the present invention, there is provided a vehicle motion control device for a vehicle, the vehicle having a plurality of wheels and a driving device for driving the wheels based on a driving force/load distribution ratio, comprising: a calculating unit for obtaining, based on equations of state that describe a state of motion of the vehicle, a damping value, which is a characteristic value that represents a convergence of the vehicle as an oscillator system; a setting unit for setting a target value of the driving force/load distribution ratio for the individual wheels, such that the damping value becomes larger than a current value of the damping value; and a driving device control unit for controlling the driving device based on the target value of the driving force/load distribution ratio.

In addition, there is provided a vehicle motion control method for controlling motion of a vehicle according to the above aspect of the invention.

Those skilled in the art will appreciate these and other advantages and benefits of various embodiments of the invention upon reading the following detailed description of the preferred embodiments with reference to the below-listed drawings.

DETAILED DESCRIPTION OF THE PREFERRED EMBODIMENTS

Embodiments of the present invention are described below with reference to the accompanying drawings to facilitate understanding of the present invention.

Note that a first through ninth embodiments are described below: in some cases, an identical variable is referred to by using different notations between in the first embodiment and the other embodiments. Therefore, the notations used in the first embodiment are valid only within the first embodiment; and the notations used in the other embodiment are valid only within those embodiments.

First Embodiment

Figure 1:
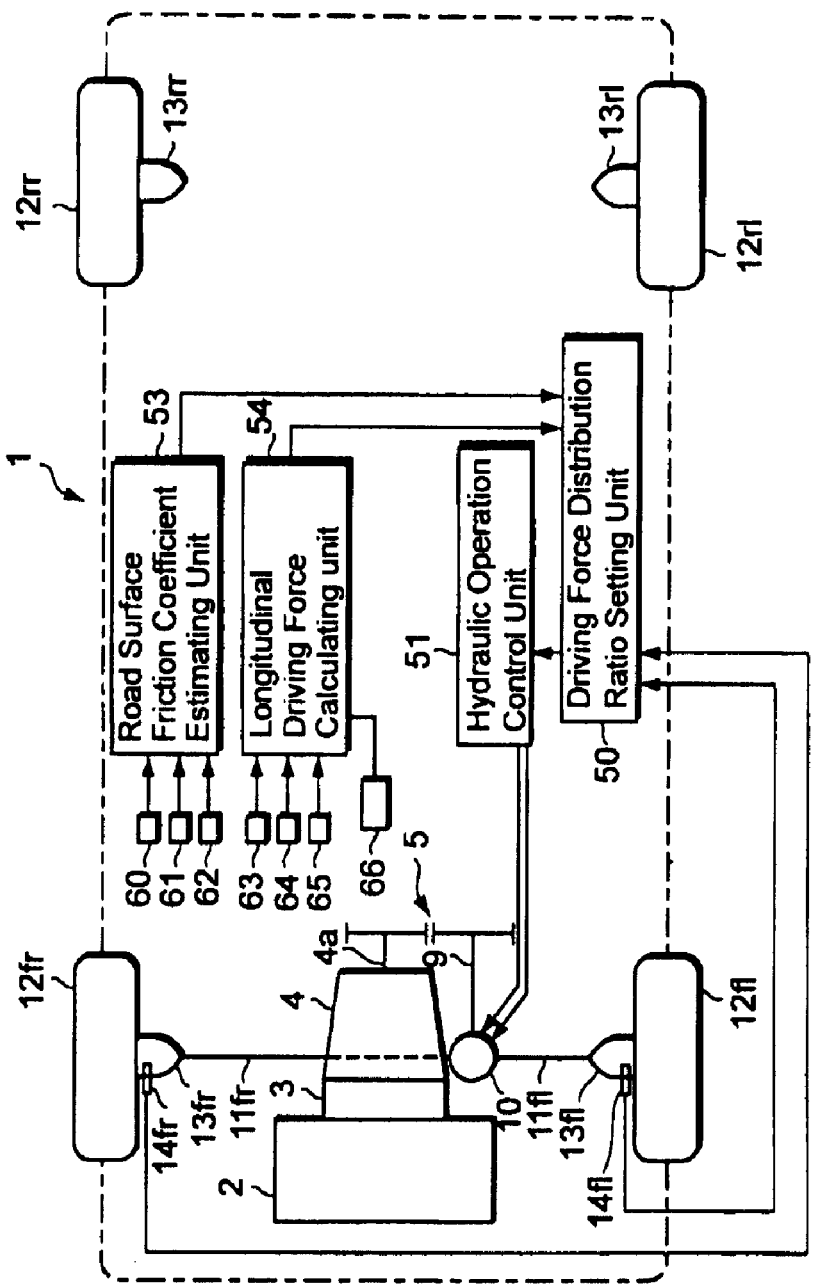
FIG. 1 is a schematic structural diagram of a driving force distribution control device according to the first example of a first embodiment of the present invention.
Figure 3:
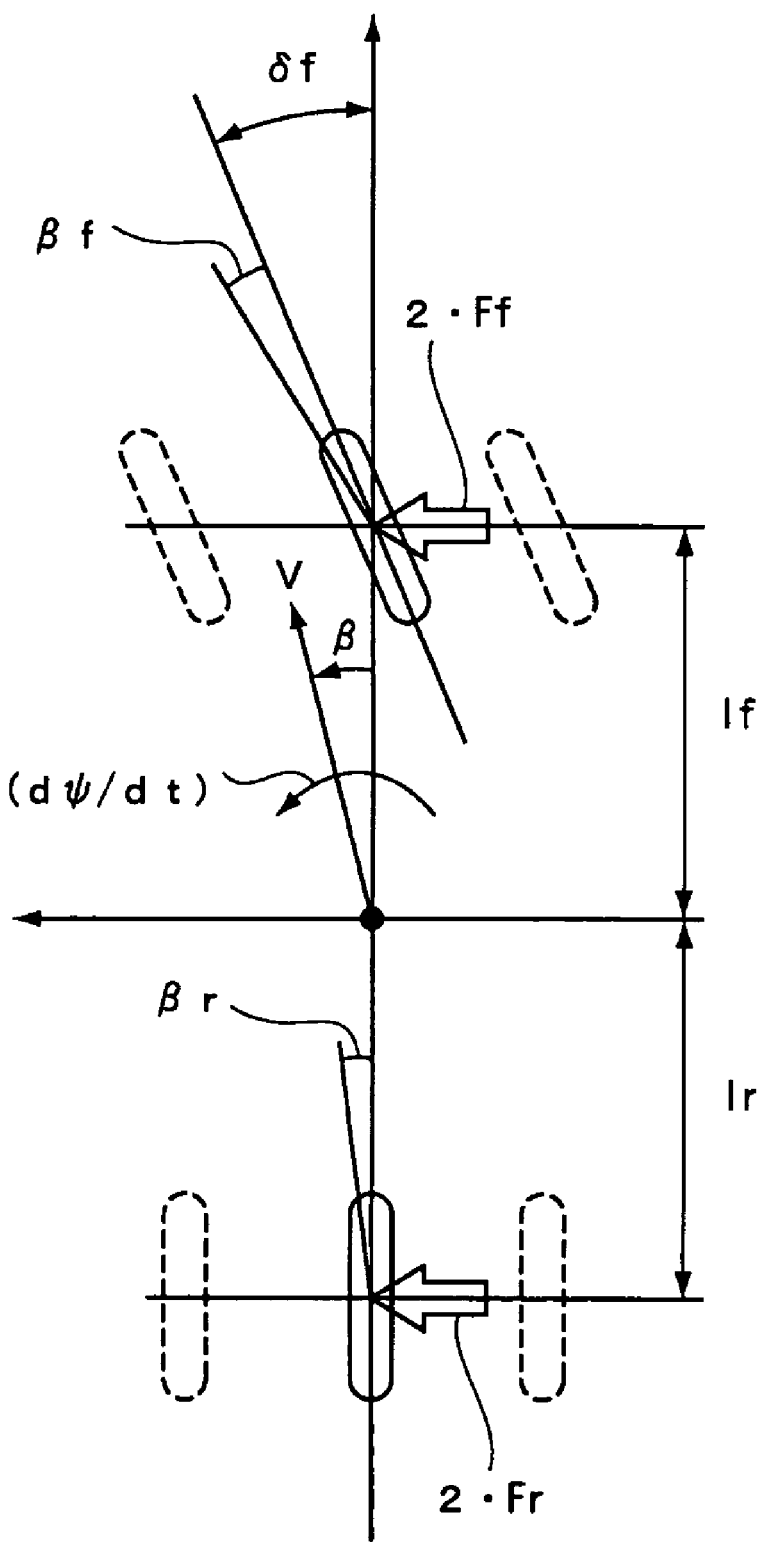
FIG. 3 is an explanatory diagram showing the two-wheel drive model equivalent to a four-wheel drive vehicle.
Figure 4:
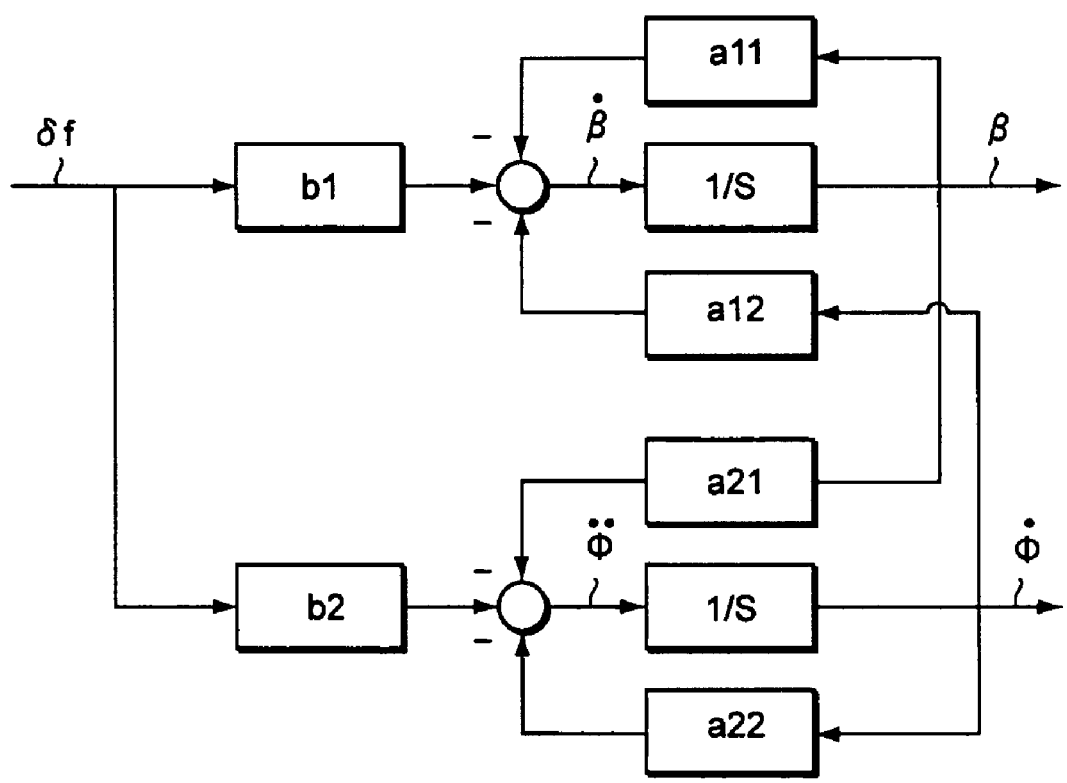
FIG. 4 is an explanatory diagram showing, functionally, the equations of state of motion for the two-wheel drive model.

A first example of a first embodiment according to the present invention is described below with reference to the accompanying drawings. FIG. 1 is a schematic diagram of a driving force distribution control device, FIG. 2 is a skeleton diagram showing the schematic structure of a front wheel final velocity reduction device, FIG. 3 is an explanatory diagram showing an equivalent two-wheel vehicle model for a 4-wheel vehicle, and FIG. 4 is an explanatory diagram showing the equations of motion functionally based on the vehicle motion model.

In FIG. 1, the reference numeral 1 indicates a vehicle such as an automobile. In the present embodiment, the vehicle 1 is a front wheel drive automobile, where a driving force generated by an engine 2 is transmitted through a torque converter 3 and a transmission 4 to a transmission output axle 4a. The driving force transmitted to the transmission output axle 4a is further transmitted through a reduction gear array 5 to a drive axle (front drive axle) 9, and inputted to a front wheel final velocity reduction device 10. The driving force that is inputted to the front wheel final velocity reduction device 10 is further transmitted to left and right front wheels 12fl and 12fr, which are the drive wheels, through front wheel left and right axles 11fl and 11fr, which are the drive axles.

Here the front wheel final velocity reduction device 10 has variable control of the distribution ratio of the driving force between the left and right front wheels 12fl and 12fr.

Figure 2:
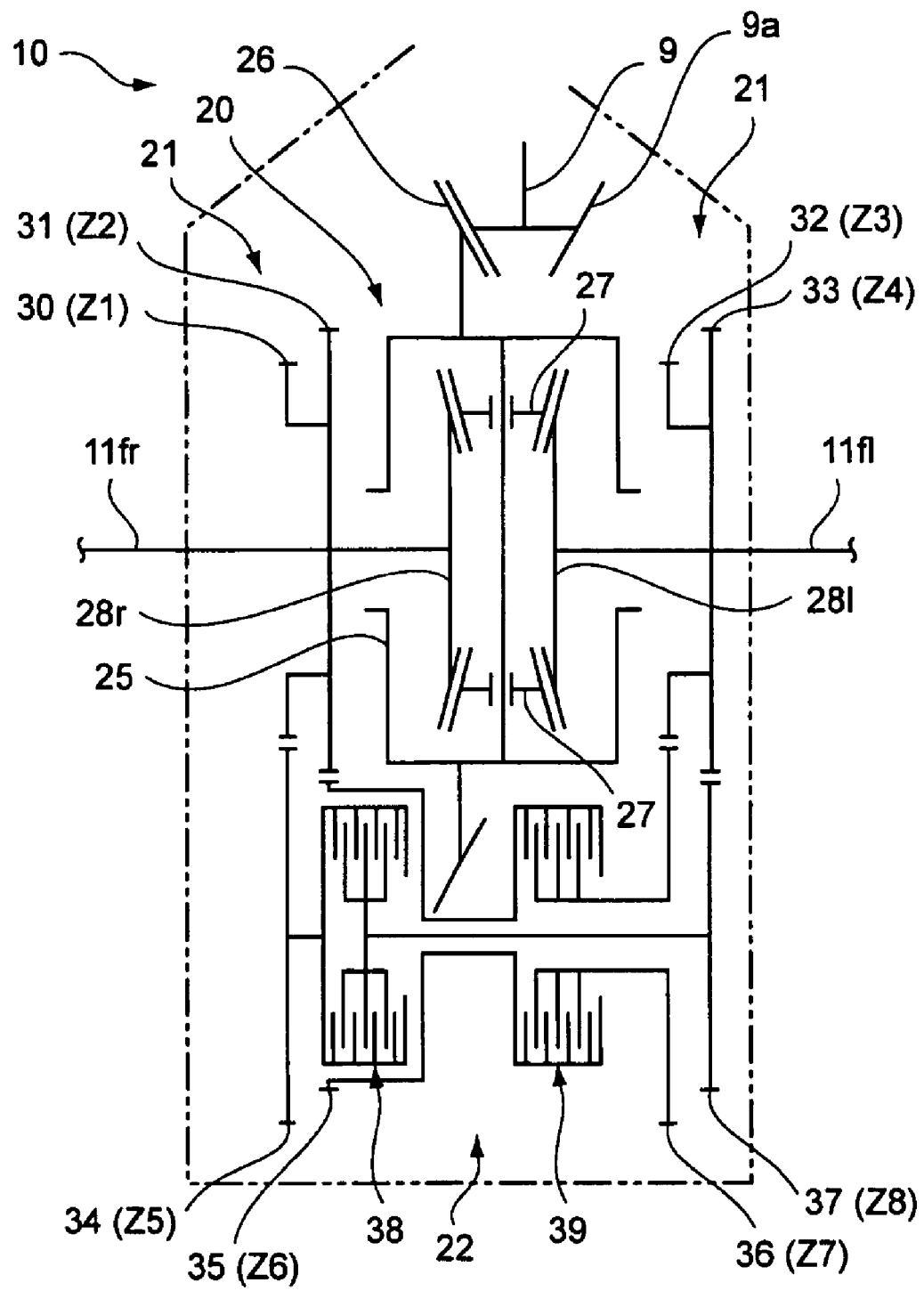
FIG. 2 is a skeleton diagram showing the schematic structure of a front wheel final velocity reduction device.

Specifically, the front wheel final velocity reduction device 10, as shown in FIG. 2, comprises a differential system 20, a gear system 21, and a clutch system 22.

The differential system 20 comprises, for example, a bevel gear-type differential system. A final gear 26, which engages with a drive pinion 9a of the front drive axle 9, is housed in a differential case 25 of the differential system 20. Moreover, in the differential case 25, a pair of differential pinions 27 are rotatably held around an axis, and the front wheel left and right axles 11fl and 11fr are connected to left and right side gears 28l and 28r that engage with the pair of differential pinions 27.

The gear system 21 comprises first and second gears 30 and 31, rigidly attached to the front wheel right axle 11fr, third and fourth gears 32 and 33, rigidly attached to the front wheel left axle 11fl, and 5th-8th gears 34-37, which engage, respectively, therewith. In the present embodiment, the second gear 31 has a larger diameter than the first gear 30, and the number of gear teeth z2 of the second gear 31 is larger than the number of gear teeth z1 of the first gear 30. Furthermore, the third gear 32 has the same diameter as the first gear 30 (where the number of gear teeth z3=z1), and the fourth gear 33 has the same diameter as the second gear 31 (where the number of gear teeth z4=z2). The 5th-8th gears 34-37 are arrayed on a single axis of rotation, parallel to the front wheel axles 11fl and 11fr. The first and 5th gears 30 and 34 comprise a first gear array by engaging with each other, where the number of gear teeth z5 of the 5th gear 34 is set so that the first gear array gear ratio (z5/z1) is, for example, 1.0. The second and 6th gears 31 and 35 comprise a second gear array by engaging with each other, where the number of gear teeth z6 of the 6th gear is set so that the second gear array gear ratio (z6/z2) is, for example, 0.9. The 3rd and 7th gears 32 and 36 comprise a 3rd gear array by engaging with each other, where the number of gear teeth z7 of the 7th gear is set so that the 3rd gear array gear ratio (z7/z3) is, for example, 1.0. The 4th and 8th gears 33 and 37 comprise a fourth gear array by engaging with each other, and the number of gear teeth z8 of the 8th gear is set so that the 4th gear array gear ratio (z8/z4) is, for example, 0.9.

The clutch system 22 comprises a first hydraulic multi-board clutch 38 that connects detachably the 5th gear 34 and the 8th gear 37, and a second hydraulic multi-board clutch 39 that connects detachably the 6th gear 35 and the 7th gear 36. A hydraulic operation control unit 51 (see FIG. 1) is connected to a hydraulic chamber (not shown) of each of the hydraulic multiple plate clutches 38 and 39, where the hydraulic pressure supplied from the hydraulic operation control unit 51 distributes most of the driving force to the front wheel left axle 11fl when the first hydraulic multi-board clutch 38 is engaged, or, on the other hand, distributes most of the driving force to the front wheel right axle 11fr when the second hydraulic multi-board clutch 39 is engaged.

Here the hydraulic pressure values for engaging the respective hydraulic multi-board clutches 38 and 39 are calculated by the hydraulic operation control unit 51 according to the driving force distribution ratio between the left and right front wheels 12fl and 12fr, set by a driving force distribution ratio setting unit 50 (described below). The driving force distribution ratio setting unit 50 is a driving force distribution ratio setting means in the present embodiment, wherein the amount of torque distribution (the amount of the driving force distributed) can be varied according to the hydraulic pressure values. In other words, the hydraulic operation control unit 51 performs a function as a driving force distribution means, along with the front wheel final velocity reduction device 10. Note that the structure of this type of final velocity reduction devices is described in detail in, for example, Japanese Kokai Laid-open Publication H 11-263140, and is not limited to the structure described in the present embodiment. The entire disclosure of Japanese Kokai Laid-open Publication H 11-263140 is incorporated herein by reference.

As is shown in FIG. 1, the driving force distribution ratio setting unit 50 is connected to force detecting sensors 14$fl$ and 14$fr$, a road surface friction coefficient estimating unit 53, and a longitudinal driving force calculating unit 54. The force detecting sensors 14$fl$ and 14$fr$ serve as a force detecting means for detecting the forces applied to the drive wheels (the left and right front wheels 12$fl$ and 12$fr$).

In the present embodiment, the force detecting sensors 14$fl$ and 14$fr$ are embedded in axle housings 13$fl$ and 13$fr$ of the left and right front wheels 12$fl$ and 12$fr$, where at least the lateral forces (the front wheel lateral forces Ffl_y and Ffr_y) and the vertical forces (the front wheel vertical forces Ffl_z and Ffr_z), acting on the wheels 12$fl$ and 12$fr$, respectively, are detected based on the differential amount generated in the axle housings 13$fl$ and 13$fr$.

The road surface friction coefficient estimating unit 53 comprises, for example, an ABS (antilock brake system) control unit, and calculates the road surface friction coefficient μ (hereinafter termed also the road surface μ) using, for example, the estimation method proposed by the present applicants in Japanese Kokai Laid-open Publication H 8-2274. In the road surface friction coefficient estimating unit 53, a cornering power of the wheels is estimated by extrapolating to the non-linear region the equation of lateral motion described with a front wheel steering angle δf, a vehicle velocity V, and an actual yaw rate (dϕ/dt) inputted from a steering sensor 60, a vehicle velocity sensor 61, and a yaw rate sensor 62, respectively; and the road surface friction coefficient μ is estimated by using a ratio between the estimated cornering power and a cornering power equivalent to the case of μ=1.0 (high μ road) for each of the front and rear wheels. Note that the estimation method is not limited to the above approach. For example, the method disclosed by the present applicants in Japanese Kokai Laid-open Publication 2000-71968 may be employed. The entire disclosures of Japanese Kokai Laid-open Publications H 8-2274 and 2000-71968 are incorporated herein by reference.

The longitudinal driving force calculating unit 54 comprises, for example, an engine control unit, and calculates, for example, an engine driving force Fe as the longitudinal driving force (driver-requested driving force) Fx. In other words, an engine rotation number Ne, a turbine rotation number Nt, and a throttle opening angle θth are inputted into the longitudinal driving force calculating unit 54 from an engine rotation number sensor 63, a turbine rotation number sensor 64, and a throttle opening angle sensor 62. Also inputted is a current transmission gear ratio rg from a transmission control unit 66. By using these inputs, the engine driving force Fe is calculated as in Eq. (1):

$$Fe = \frac{Tt \cdot rf}{Rw} \quad (1)$$

where rf is a final gear ratio, RW is an effective radius of a tire, and Tt is a torque after the transmission gear is applied. By using an engine torque Te, a conversion ratio of the torque converter tconv, and a dynamical transmission efficiency η, Tt is expressed as in Eq. (2):

$$Tt = Te \cdot rg \cdot tconv \cdot \eta \quad (2)$$

where the engine torque Te is obtained from a map based on the engine rotation number Ne and the throttle opening angle θth; and the torque conversion ratio tconv is obtained from a map based on a velocity ratio rv (=Nt/Ne) of the torque converter.

Using front and rear wheel cornering forces (per wheel) Ff and Fr, a mass of the vehicle M, and a lateral acceleration ($d^2y/dt^2$) in the vehicle motion model in FIG. 3, the equation of motion related to the translational motion in the lateral direction of the vehicle is given by Eq. (3):

$$M \cdot \frac{d^2 y}{dt^2} = 2Ff + 2 \cdot Fr \quad (3)$$

On the other hand, using the distances from the center of mass to the front and rear wheel axles lf and lr, a moment of inertia of the vehicle Iz, and a yaw angular acceleration ($d^2\phi/dt^2$), the equation of motion pertaining to the rotational movement about the center of mass is given by Eq. (4):

$$Iz \cdot \frac{d^2 \phi}{dt^2} = 2 \cdot Fr \cdot lf - 2Fr \cdot lr \quad (4)$$

Moreover, using a vehicle sliding angle β and a vehicle sliding angular velocity (dβ/dt), the lateral acceleration ($d^2y/dt^2$) is expressed as in Eq. (5):

$$\frac{d^2 y}{dt^2} = V \cdot \left( \frac{d\beta}{dt} + \frac{d\phi}{dt} \right) \quad (5)$$

Using front and rear wheel equivalent cornering powers Kf and Kr and front and rear wheel lateral sliding angles βf and βr, the front and rear wheel average cornering forces Ff_y and Fr_y are expressed as follows:

$$\text{Ff}\_y = Kf \cdot \beta f - \frac{Kf^2 \cdot \beta f^2}{4 \cdot \text{Ff}\_y\text{MAX}} \quad (6)$$

$$\text{Fr}\_y = Kr \cdot \beta r - \frac{Kr^2 \cdot \beta r^2}{4 \cdot \text{Fr}\_y\text{MAX}} \quad (7)$$

The actual front and rear wheel cornering powers Kf_a and Kr_a are given by the following equations:

$$\text{Ff}\_a = \frac{\partial \text{Ff}\_y}{\partial \beta f} = Kf - \frac{Kf^2 \cdot |\beta f|}{2 \cdot \text{Ff}\_y\text{MAX}} \quad (8)$$

$$\text{Fr}\_a = \frac{\partial \text{Fr}\_y}{\partial \beta r} = Kr - \frac{Kr^2 \cdot |\beta r|}{2 \cdot \text{Fr}\_y\text{MAX}} \quad (9)$$

Here, using the front and rear wheel average longitudinal forces Ff_x and Fr_x and the front and rear wheel average vertical forces Ff_z and Fr_z, Ff_y MAX and Fr_y MAX in the above equations are expresses as follows:

$$Ff\_yMAX = (\mu^2 \cdot Ff\_z^2 - Ff\_x^2)^{\frac{1}{2}} \quad (10)$$

$$Ff\_yMAX = (\mu^2 \cdot Fr\_z^2 - Fr\_x^2)^{\frac{1}{2}} \quad (11)$$

Moreover, by use of the front wheel steering angle δf, the front and rear wheel lateral sliding angles βf and βr can be simplified as follows:

$$\beta f = \beta + lf \cdot \frac{\frac{d\phi}{dt}}{V} - \delta f \quad (12)$$

$$\beta r = \beta + lr \cdot \frac{\frac{d\phi}{dt}}{V} \quad (13)$$

The equations of motion described above lead to the equations of state for obtaining the vehicle sliding angle β and the yaw rate (dφ/dt), using the steering angle δf as the input, as shown below:

$$\begin{bmatrix} \frac{d\beta}{dt} \\ \frac{d^2\phi}{dt^2} \end{bmatrix} = \begin{bmatrix} -a11 & -a12 \\ -a21 & -a22 \end{bmatrix} \begin{bmatrix} \beta \\ \frac{d\phi}{dt} \end{bmatrix} + \begin{bmatrix} b1 & 0 \\ b2 & 0 \end{bmatrix} \begin{bmatrix} \delta f \\ 0 \end{bmatrix} \quad (14)$$

$$a11 = 2 \cdot \frac{kf\_a + kr\_a}{M \cdot V} \quad (15)$$

$$a12 = 1 + 2 \cdot \frac{lf \cdot kf\_a - lr \cdot kr\_a}{M \cdot V^2} \quad (16)$$

$$a21 = 2 \cdot \frac{lf \cdot kf\_a - lr \cdot kr\_a}{Iz} \quad (17)$$

$$a22 = 2 \cdot \frac{lf^2 \cdot kf\_a - lr^2 \cdot kr\_a}{Iz \cdot V} \quad (18)$$

$$b1 = 2 \cdot \frac{kf\_a}{M \cdot V} \quad (19)$$

$$b2 = 2 \cdot lf \cdot \frac{kf\_a}{Iz} \quad (20)$$

The relationships among these parameters are shown in FIG. 4.

Here, in Eq. (14), the contribution of the a11 term to the convergence of the vehicle sliding angle is well known: the more linearly this term varies, the greater the stability of the vehicle, and greater the feeling of responsiveness experienced by the driver. Let the left front wheel longitudinal force be Ffl_x, the right front wheel longitudinal force be Ffr_x, the left rear wheel longitudinal force be Frl_x, the right rear wheel longitudinal force be Frr_x, the left front wheel vertical force be Ffl_z, the right front wheel vertical force be Ffr_z, the left rear wheel vertical force be Frl_z, and the right rear wheel vertical force be Frr_z, using Eqs. (8)-(11), then the a11 term can be expanded in terms of the cornering powers kfl_a, kfr_a, krl_a and krr_a of each of the wheels as follows:

$$a11 = \frac{kfl\_a + kfr\_a + krl\_a + krr\_a}{M \cdot V} = \frac{1}{M \cdot V} \cdot \left[ 2 \cdot (Kf + Kr) - \frac{1}{2} \cdot \left[ \frac{Kf^2}{(\mu fl^2 \cdot Ffl\_z^2 - Ffl\_x^2)^{\frac{1}{2}}} + \frac{Kf^2}{(\mu fr^2 \cdot Ffr\_z^2 - Ffr\_x^2)^{\frac{1}{2}}} \right] \cdot |\beta f| - \frac{1}{2} \cdot \left[ \frac{Kr^2}{(\mu rl^2 \cdot Frl\_z^2 - Frl\_x^2)^{\frac{1}{2}}} + \frac{Kr^2}{(\mu rr^2 \cdot Frr\_z^2 - Frr\_x^2)^{\frac{1}{2}}} \right] \cdot |\beta r| \right] \quad (21)$$

When the front and rear wheel lateral sliding angles βf and βr are sufficiently small, the following approximations can be obtained: Kf·|βf|=|Ffl_y|=|Ffr_y| (where Ffl_y is the left front wheel lateral force and Ffr_y is the right front wheel lateral force), and Kr·|βr|=|Frl_y|=|Frr_y| (where Frl_y is the left rear wheel lateral force and Frr_y is the right rear lateral force). Using these approximations, Eq. (21) can be rewritten as follows:

$$a11 = \frac{1}{M \cdot V} \cdot \left[ 2 \cdot (Kf + Kr) - \frac{1}{2} \cdot \left[ Kf \cdot \frac{|Ffl\_y|}{(\mu fl^2 \cdot Ffl\_z^2 - Ffl\_x^2)^{\frac{1}{2}}} + Kf \cdot \frac{|Ffr\_y|}{(\mu fr^2 \cdot Ffr\_z^2 - Ffr\_x^2)^{\frac{1}{2}}} \right] - \frac{1}{2} \cdot \left[ Kr \frac{|Frl\_y|}{(\mu rl^2 \cdot Frl\_z^2 - Frl\_x^2)^{\frac{1}{2}}} + Kr \frac{|Frr\_y|}{(\mu rr^2 \cdot Frr\_z^2 - Frr\_x^2)^{\frac{1}{2}}} \right] \right] \quad (22)$$

In the following, a front/rear driving force distribution ratio is denoted by a (where $0 \leq a \leq 1$), a front wheel right/left driving force distribution ratio is denoted by b (where $0 \leq b \leq 1$), and a rear wheel right/left driving force distribution ratio is denoted by c (where $0 \leq c \leq 1$). Then the driving force for each of the wheels 12fl, 12fr, 12rl, and 12rr (denoted by Ffl_x, Ffr_x, Frl_x and Frr_x) is expressed in terms of a driver-requested driving force Fx as follows:

$$Ffl\_x = a \cdot b \cdot Fx \quad (23)$$

$$Ffr\_x = a \cdot (1-b) \cdot Fx \quad (24)$$

$$Frl\_x = (1-a) \cdot c \cdot Fx \quad (25)$$

$$Frr\_x = (1-a) \cdot (1-c) \cdot Fx \quad (26)$$

Substituting these expressions into Eq. (22) leads to the following:

$$a11 = \quad (27)$$

$$\frac{1}{M \cdot V} \cdot \left[ 2 \cdot (Kf + Kr) - \frac{1}{2} \cdot \left[ Kf \cdot \frac{|Ffl\_y|}{(\mu fl^2 \cdot Ffl\_z^2 - a^2 \cdot b^2 \cdot Fx^2)^{\frac{1}{2}}} + Kf \cdot \frac{|Ffr\_y|}{(\mu fl^2 \cdot Ffl\_z^2 - a^2 \cdot (1-b)^2 \cdot Fx^2)^{\frac{1}{2}}} \right] - \right.$$

-continued $$\frac{1}{2} \cdot \left[ Kr \frac{|\text{Frl\_y}|}{(\mu rl^2 \cdot \text{Frl\_z}^2 - (1-a)^2 \cdot c^2 \cdot Fx^2)^{\frac{1}{2}}} + Kr \frac{|\text{Frr\_y}|}{(\mu rr^2 \cdot \text{Frr\_z}^2 - (1-a)^2(1-c)^2 \cdot Fx^2)^{\frac{1}{2}}} \right]$$

In Eq. (27), the terms inside the braces [ ] are dependent on the front and rear wheel cornering powers Kf_a and Kr_a. Using the following relationships:

$$2 \cdot Ff\_x = a \cdot Fx \tag{28}$$

$$2 \cdot Fr\_x = (1-a) \cdot Fx \tag{29}$$

the front and rear wheel cornering powers Kf_a and Kr_a are extracted from Eq. (27) as follows:

$$kf\_a = Kf - \frac{Kf \cdot |\text{Ffl\_y}|}{4 \cdot (\mu fl^2 \cdot \text{Ffl\_z}^2 - a^2 \cdot b^2 \cdot Fx^2)^{\frac{1}{2}}} - \frac{Kf \cdot |\text{Ffr\_y}|}{4 \cdot (\mu fr^2 \cdot \text{Ffr\_z}^2 - a^2 \cdot (1-b)^2 \cdot Fx^2)^{\frac{1}{2}}} \tag{30}$$

$$= Kf - \frac{Kf \cdot |\text{Ffl\_y}|}{4 \cdot (\mu fl^2 \cdot \text{Ffl\_z}^2 - 4 \cdot b^2 \cdot \text{Ff\_x}^2)^{\frac{1}{2}}} - \frac{Kf \cdot |\text{Ffr\_y}|}{4 \cdot (\mu fr^2 \cdot \text{Ffr\_z}^2 - a^2 \cdot 4 \cdot (1-b)^2 \cdot \text{Ff\_x}^2)^{\frac{1}{2}}}$$

$$kr\_a = Kr - \frac{Kr \cdot |\text{Frl\_y}|}{4 \cdot (\mu rl^2 \cdot \text{Frl\_z}^2 - (1-a)^2 \cdot c^2 \cdot Fx^2)^{\frac{1}{2}}} - \frac{Kr \cdot |\text{Frr\_y}|}{4 \cdot (\mu rr^2 \cdot \text{Frr\_z}^2 - (1-a)^2 \cdot (1-c)^2 \cdot Fx^2)^{\frac{1}{2}}} \tag{31}$$

$$= Kr - \frac{Kr \cdot |\text{Frl\_y}|}{4 \cdot (\mu rl^2 \cdot \text{Frl\_z}^2 - 4 \cdot c^2 \cdot \text{Fr\_x}^2)^{\frac{1}{2}}} - \frac{Kr \cdot |\text{Frr\_y}|}{4 \cdot (\mu rr^2 \cdot \text{Frr\_z}^2 - 4 \cdot (1-c)^2 \cdot \text{Fr\_x}^2)^{\frac{1}{2}}}$$

As seen clearly from Eqs. (30) and (31), for the case of a front-wheel drive vehicle with the front/rear driving force distribution ratio a=1, it is possible to minimize the nonlinear term of a11 in Eq. (27) by obtaining the front wheel right/left driving force distribution ratio b that minimizes the nonlinear term of the front wheel cornering power kf_a. Based on this fact, in the driving force distribution ratio setting unit 50, the front wheel right/left driving force distribution ratio b is obtained so as to minimize the nonlinear term of the front wheel cornering power Kf_a:

$$\text{Nonlinear term} = \frac{Kf \cdot |\text{Ffl\_y}|}{4 \cdot (\mu fl^2 \cdot \text{Ffl\_z}^2 - 4 \cdot b^2 \cdot \text{Ff\_x}^2)^{\frac{1}{2}}} + \frac{Kf \cdot |\text{Ffr\_y}|}{4 \cdot (\mu fr^2 \cdot \text{Ffr\_z}^2 - 4 \cdot (1-b)^2 \cdot \text{Ff\_x}^2)^{\frac{1}{2}}} \tag{32}$$

and this front wheel right/left driving force distribution ratio b is set as the control value for the distribution ratio when transmitting the driving force 2·Ff_x(=a·Fx) from the front wheel final velocity reduction device 10 to the front wheel left and right axles 11fl and 11fr.

Specifically, in the driving force distribution ratio setting unit 50, the front wheel lateral force Ffl_y and front wheel vertical force Ffl_z, detected by the force detecting sensor 14fl, are substituted for Ffl_y and Ffl_z in Eq. (32), and the front wheel lateral force Ffr_y and front wheel vertical force Ffr_z, detected by the force detecting sensor 14fr, are substituted for Ffr_y and Ffr_z in Eq. (32). Moreover, by assuming that the road surface μ acting on each wheel is identical, the road surface μ estimated by the road surface friction coefficient estimating unit 53 is substituted for μfl and μfr in Eq. (32), and the driving force Fx calculated by the longitudinal driving force calculating unit 54 is substituted for Ff_x (=Fx/2) in Eq. (32).

Thereafter, by inputting, sequentially b=0.0, 0.1, . . . 0.9, 1.0, for example, into b in Eq. (32), the driving force distribution ratio setting unit 50 proceeds to find the front wheel right/left driving force distribution ratio b that minimizes the nonlinear term of the front wheel cornering power Kf_a.

Therefore, as seen above, it is possible to set a driving force distribution ratio that provides superior stability to disturbances through effective utilization of the tire grip by minimizing the nonlinear term in the cornering power, which is anticipated to actually be generated at vehicle wheels.

Moreover, because the driving force distribution control causes the change in the cornering power generated at the vehicle wheels to approach a linear variation, it is possible to improve the response, and to thereby operate the vehicle with the feeling of being in the normal domain even when the tires approach the nonlinear domain.

Furthermore, because the wheel's lateral force and vertical force, obtained directly from the force detecting sensors, are used in estimating the cornering power, it is possible to achieve driving force distribution control with excellent precision according to actual vehicle behavior.

Figure 5:
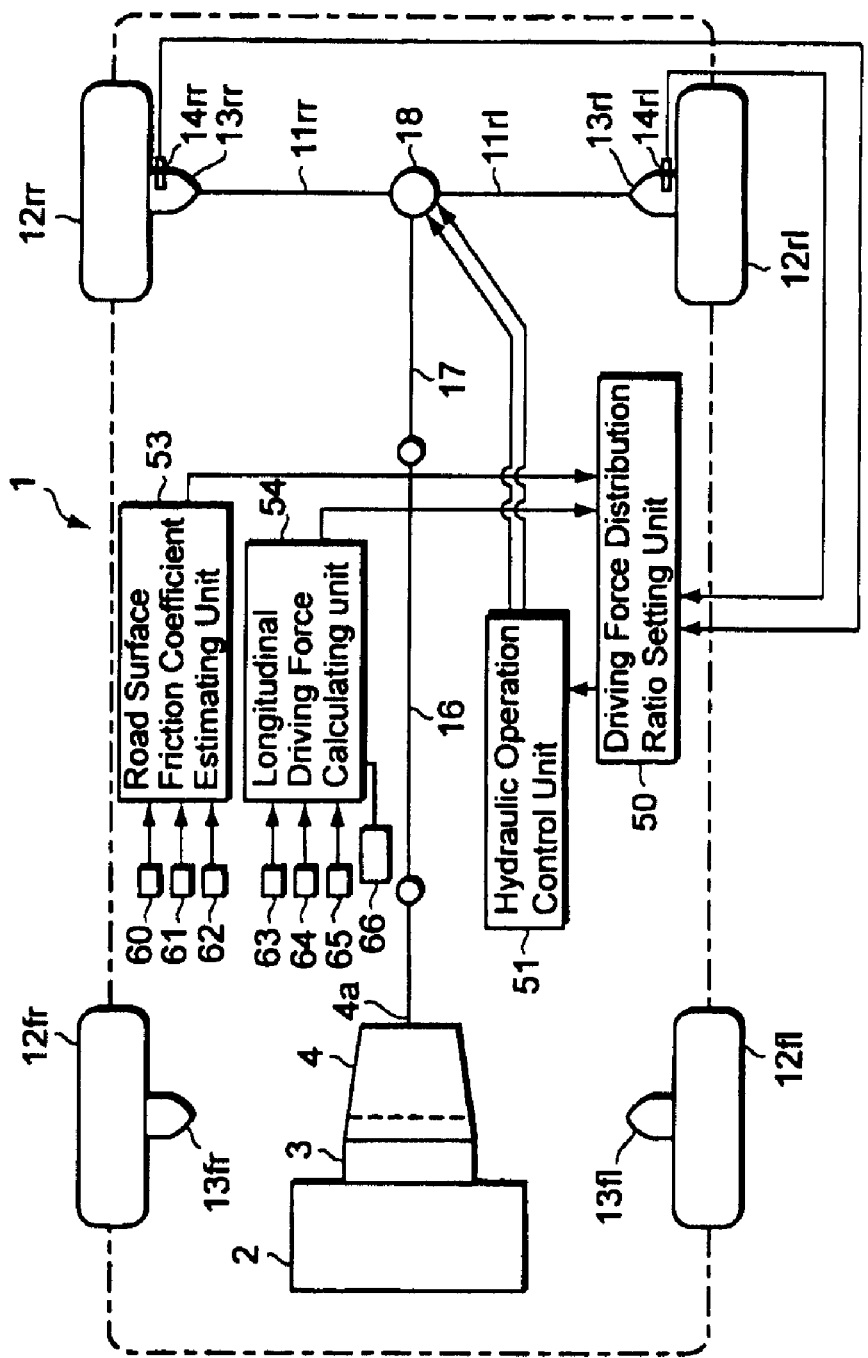
FIG. 5 is a schematic structural diagram of a driving force distribution control device according to the second example of the first embodiment of the present invention.

Next, FIG. 5 is a schematic structural diagram of a driving force distribution control device according to a second example of the present first embodiment. This example describes the case wherein the rear wheel right/left driving force distribution ratio c is set by the driving force distribution ratio setting unit 50. Note that the explanations of notations are omitted for structural elements that are identical to those in the first example of the present embodiment.

As is shown in FIG. 5, the driving force generated by the engine 2 in the present example is transmitted through the torque converter 3 and the transmission 4 to the transmission output axle 4a. The driving force transmitted to the transmission output axle 4a is further transmitted through a propeller shaft 16 to a drive pinion axle 17, and is inputted to a rear wheel final velocity reduction device 18. The driving force inputted to the rear wheel final velocity reduction device 18 is further transmitted to the left and right rear wheels 12rl and 12rr, which are the drive wheels, through the rear wheel left and right axles 11rl and 11rr, which are the drive axles.

Here the rear wheel final velocity reduction device 18 has variable control of the distribution ratio of the driving force that is transmitted to the left and right rear wheels 12rl and 12rr. Specifically, the rear wheel final velocity reduction device 18 is structured in essentially the same way as the front wheel final velocity reduction device 10 shown in FIG. 2 in the first example of the present embodiment. In this case, with respect to the rear wheel final velocity reduction device 18, the drive pinion axle 17 corresponds to the front drive axle 9 shown in FIG. 2, and the rear wheel left and right axles 11rl and 11rr correspond to the front wheel left and right axles 11fl and 11fr shown in FIG. 2.

Here, in the rear wheel final velocity reduction device 18, the hydraulic pressure values for engaging the respective hydraulic multi-board clutches 38 and 39 are calculated by the hydraulic operation control unit 51 according to the driving force distribution ratio between the left and right rear wheels 12rl and 12rr, set by the driving force distribution ratio setting unit 50. The distributed amounts of the driving force can be varied according to these hydraulic pressure values. In other words, the hydraulic operation control unit 51 performs a function as a driving force distribution means, along with the rear wheel final velocity reduction device 18.

As is shown in FIG. 5, the force detecting sensors 14rl and 14rr are connected to the driving force distribution ratio setting unit 50, and are force detecting means for detecting the forces applied to the wheels (the left and right rear wheels 12rl and 12rr). In the present embodiment, the force detecting sensors 14rl and 14rr are embedded in the axle housings 13rl and 13rr of the left and right rear wheels 12rl and 12rr, and detect at least the forces in the lateral direction (rear wheel lateral forces Frl_y and Frr_y) and forces in the vertical direction (rear wheel vertical forces Frl_z and Frr_z) that act upon each of the wheels 12rl and 12rr, based on the differential amount generated in the axle housings 13rl and 13rr.

As seen clearly from Eqs. (30) and (31), for the case of a rear-wheel drive vehicle with the front/rear driving force distribution ratio a=0, it is possible to minimize the nonlinear term of a11 in Eq. (27) by obtaining the rear wheel right/left driving force distribution ratio c that minimizes the nonlinear term of the rear wheel cornering power Kr_a.

Based on this fact, in the driving force distribution ratio setting unit 50, the rear wheel right/left driving force distribution ratio c is obtained so as to minimize the nonlinear term of the rear wheel cornering power Kr_a:

$$\text{Nonlinear term} = \frac{Kr \cdot |Ffl\_y|}{4 \cdot (\mu rl^2 \cdot Frl\_z^2 - 4 \cdot c^2 \cdot Fr\_x^2)^{\frac{1}{2}}} + \frac{Kr \cdot |Frr\_y|}{4 \cdot (\mu rr^2 \cdot Frr\_z^2 - 4 \cdot (1-c)^2 \cdot Fr\_x^2)^{\frac{1}{2}}} \quad (33)$$

and this rear wheel right/left driving force distribution ratio c is set as the control value for the distribution ratio when transmitting the driving force 2·Ff_x(=(1−a)·Fx) from the rear wheel final velocity reduction device 18 to the rear wheel left and right axles 11rl and 11rr.

Specifically, in the driving force distribution ratio setting unit 50, the rear wheel lateral force Frl_y and rear wheel vertical force Frl_z, detected by the force detecting sensor 14rl, are substituted for Frl_y and Frl_z in Eq. (33), and the rear wheel lateral force Frr_y and rear wheel vertical force Frr_z, detected by the force detecting sensor 14rr, are substituted for Frr_y and Frr_z in Eq. (33). Moreover, by assuming that the road surface μ acting on each wheel is identical, the road surface μ estimated by the road surface friction coefficient estimating unit 53 is substituted for μrl and μrr in Eq. (33), and the driving force Fx calculated by the longitudinal driving force calculating unit 54 is substituted for Ff_x (=Fx/2) in Eq. (33).

Thereafter, by inputting, sequentially c=0.0, 0.1, . . . 0.9, 1.0, for example, into c in Eq. (33), the driving force distribution ratio setting unit 50 proceeds to find the rear wheel right/left driving force distribution ratio c that minimizes the nonlinear term of the rear wheel cornering power Kr_a.

According to the above second example of the present embodiment, it is possible to achieve the same effect as in the first example for the rear wheel driving force distribution control.

Figure 6:
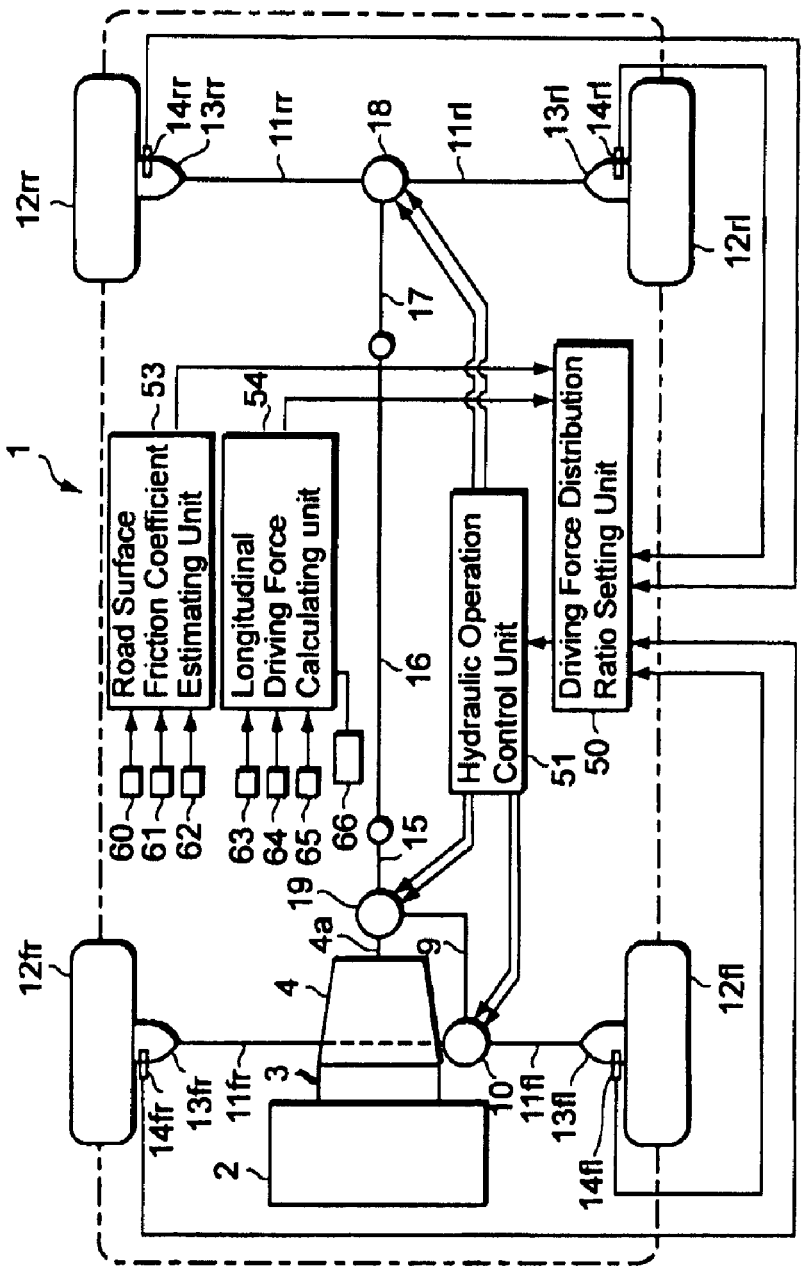
FIG. 6 is a schematic structural diagram of a driving force distribution control device according to the third example of the first embodiment of the present invention.

Next, FIG. 6 is a schematic structural diagram of a driving force distribution control device according to a third example of the present first embodiment. This example describes the case wherein the front/rear wheel driving force distribution ratio a is set by the driving force distribution ratio setting unit 50. Note that the explanations of notations are omitted for structural elements that are identical to those in the first or second example of the present embodiment.

As shown in FIG. 6, the driving force generated by the engine 2 in the present example is transmitted through the torque converter 3, the transmission 4, and the transmission output axle 4a to a center differential device 19. The driving force transmitted to the center differential device 19 is further transmitted through the rear drive axle 15, the propeller shaft 16, and the drive pinion axle 17, and is inputted to the rear wheel final velocity reduction device 18, as well as transmitted thorough the front drive axle 9 to the front wheel final velocity reduction device 10.

Here, the center differential device 19 has variable control of the distribution ratio of the driving force that is transmitted to the front drive axle 9 and the rear drive axle 15, which are drive axles. Specifically, the center differential device 19 is structured in essentially the same way as the front wheel final velocity reduction device 10 shown in FIG. 2 in the first example of the present embodiment. In this case, with respect to the center differential device 19, the transmission output axle 4a corresponds to the front drive axle 9 shown in FIG. 2, the front drive axle 9 corresponds to the front wheel right axle 11 fr shown in FIG. 2, and the rear drive axle 15 corresponds to the front wheel left axle 11fl shown in FIG. 2.

Here, in the center differential device 19, the hydraulic pressure values for engaging the respective hydraulic multi-board clutches 38 and 39 are calculated by the hydraulic operation control unit 51 according to the driving force distribution ratio between the front and rear wheels, set by the driving force distribution ratio setting unit 50. The distributed amounts of the driving force can be varied according to these hydraulic pressure values. In other words, the hydraulic operation control unit 51 performs a function as a driving force distribution means, along with the center differential device 19.

As shown in FIG. 6, the force detecting sensors 14fl, 14fr, 14rl, and 14rr are connected to the driving force distribution ratio setting unit 50, and are force detecting means for detecting the forces applied on the wheels (the left and right front wheels 12fl and 12fr, and the left and right rear wheels 12rl and 12rr).

In the present example, the driving force distribution ratios b and c are assumed to be b=c=½, and the front/rear driving force distribution ratio a is obtained so as to minimize the nonlinear terms in Eqs. (30) and (31). In other words, using the following relationships:

Front wheel average lateral force=Ff_y(=Ffl_y+Ffr_y)/2),

Rear wheel average lateral force=Fr_y(=Frl_y+Frr_y)/2),

Front wheel average vertical force=Ff_z(=Ffl_z+Ffr_z)/2), and

Rear wheel average vertical force=Fr_z(=Frl_z+Frr_z)/2), the nonlinear term of the four wheel cornering power $Kfr\_a(=Kf\_a+Kr\_a)$ can be expressed as:

$$\text{Nonlinear term} = \frac{Kf \cdot |Ffl\_y|}{4 \cdot \left(\mu fl^2 \cdot Ffl\_z^2 - a^2 \cdot \frac{Fx^2}{4}\right)^{\frac{1}{2}}} + \frac{Kf \cdot |Ffr\_y|}{4 \cdot \left(\mu fr^2 \cdot Ffr\_z^2 - a^2 \cdot \frac{Fx^2}{4}\right)^{\frac{1}{2}}} + \quad (34)$$

$$\frac{Kr \cdot |Frl\_y|}{4 \cdot \left(\mu rl^2 \cdot Frl\_z^2 - (1-a)^2 \cdot \frac{Fx^2}{4}\right)^{\frac{1}{2}}} +$$

$$\frac{Kr \cdot |Frr\_y|}{4 \cdot \left(\mu rr^2 \cdot Frr\_z^2 - (1-a)^2 \cdot \frac{Fx^2}{4}\right)^{\frac{1}{2}}} \approx$$

$$Kf \cdot \frac{|Ff\_y|}{2 \cdot \left(\mu f^2 \cdot Ff\_z^2 - a^2 \cdot \frac{Fx^2}{4}\right)^{\frac{1}{2}}} +$$

$$Kr \cdot \frac{|Fr\_y|}{2 \cdot \left(\mu r^2 \cdot Fr\_z^2 - (1-a)^2 \cdot \frac{Fx^2}{4}\right)^{\frac{1}{2}}}$$

where, $Ffl\_y \approx Ffr\_y \approx Ff\_y, Frl\_y \approx Frr\_y \approx Fr\_y$ $Ffl\_z \approx Ffr\_z \approx Ff\_z, Frl\_z \approx Frr\_z \approx Fr\_z.$ In the driving force distribution ratio setting unit 50, the rear/front driving force distribution ratio a that minimizes Eq. (34) is obtained by essentially the same process as in the first and second examples, and this driving force distribution ratio is set as the control value for the distribution ratio when transmitting the driving force Fx from the center differential device 19 to the front drive axle 9 and the rear drive axel 15.

Moreover, in the driving force distribution ratio setting unit 50, the front wheel driving force Ff_x and the rear wheel driving force Fr_x, obtained based on the set driving force distribution ratio a, can both be used to set the front wheel right/left driving force distribution ratio b and the rear wheel right/left driving force distribution ratio c. Specifically, although in the first and second examples, some of the distribution ratios were set to be 1 or 0, the values calculated as above may be used to obtain the driving force distribution ratio a that minimizes the nonlinear terms in the front wheel cornering power Kf_a and the rear wheel cornering power Kr_a.

According to this example of the present embodiment, it is possible to provide essentially the same effect as in the first example even for driving force distribution control for all four wheels, including controlling the driving force distribution to the front and rear wheels. Note that in this case, instead of the tire lateral forces Ffl_y, Ffr_y, Frl_y and Frr_y, the tire sliding angles βf and βr for the front and rear wheels, obtained from Eqs. (12) and (13), may be used to obtain the following nonlinear terms:

$$\text{Nonlinear term} = \frac{Kf^2 \cdot |\beta f|}{4 \cdot (\mu fl^2 \cdot Ffl\_z^2 - 4 \cdot b^2 \cdot Ff\_x^2)^{\frac{1}{2}}} + \quad (32')$$

$$\frac{Kf^2 \cdot |\beta f|}{4 \cdot (\mu fr \cdot Ffr\_z^2 - 4 \cdot (1-b)^2 \cdot Ff\_x^2)^{\frac{1}{2}}}$$

$$\text{Nonlinear term} = \frac{Kr^2 \cdot |\beta r|}{4 \cdot (\mu rl^2 \cdot Frl\_z^2 - 4 \cdot c^2 \cdot Fr\_x^2)^{\frac{1}{2}}} + \quad (33')$$

$$\frac{Kr^2 \cdot |\beta r|}{4 \cdot (\mu rr \cdot Frr\_z^2 - 4 \cdot (1-c)^2 \cdot Fr\_x^2)^{\frac{1}{2}}}$$

$$\text{Nonlinear term} = Kf^2 \cdot \frac{|\beta f|}{2 \cdot \left(\mu f^2 \cdot Ff\_z^2 - a^2 \cdot \frac{Fx^2}{4}\right)^{\frac{1}{2}}} + \quad (34')$$

$$Kr^2 \cdot \frac{|\beta f|}{2 \cdot \left(\mu r^2 \cdot Fr\_z^2 - (1-a)^2 \cdot \frac{Fx^2}{4}\right)^{\frac{1}{2}}}$$

Note that the various equations including the linear terms and nonlinear terms representing the cornering powers, as well as their variations and approximations, are not limited to those described above.

Furthermore, although, in the three examples of the present embodiment, explanations were given for driving force distribution to the left and right wheels using an FF vehicle (front engine-front wheel drive vehicle), an FR vehicle (front engine-rear wheel drive vehicle), and a four-wheel drive vehicle, respectively, the present invention is not limited thereto. For example, in the case of a four-wheel independent-motor driven vehicle which is equipped with four independent motors to provide driving forces to respective wheels, it is possible to apply the present invention to control the left and right wheel motor driving forces or four-wheel motor driving forces. In this case, the calculation and control units for obtaining the driving forces for the respective wheels correspond to the vehicle driving force distribution control means.

Second Embodiment

Prior to describing the system structure and system processes regarding the vehicle motion control device according to a second embodiment, first the system matrix in the equations of state is explained below in order to define the control concept. Note that the braking force can be viewed as the reverse-direction component (the negative component) of the driving force, and thus the "driving force" in the present embodiment is defined to include the braking force.

Figure 7:
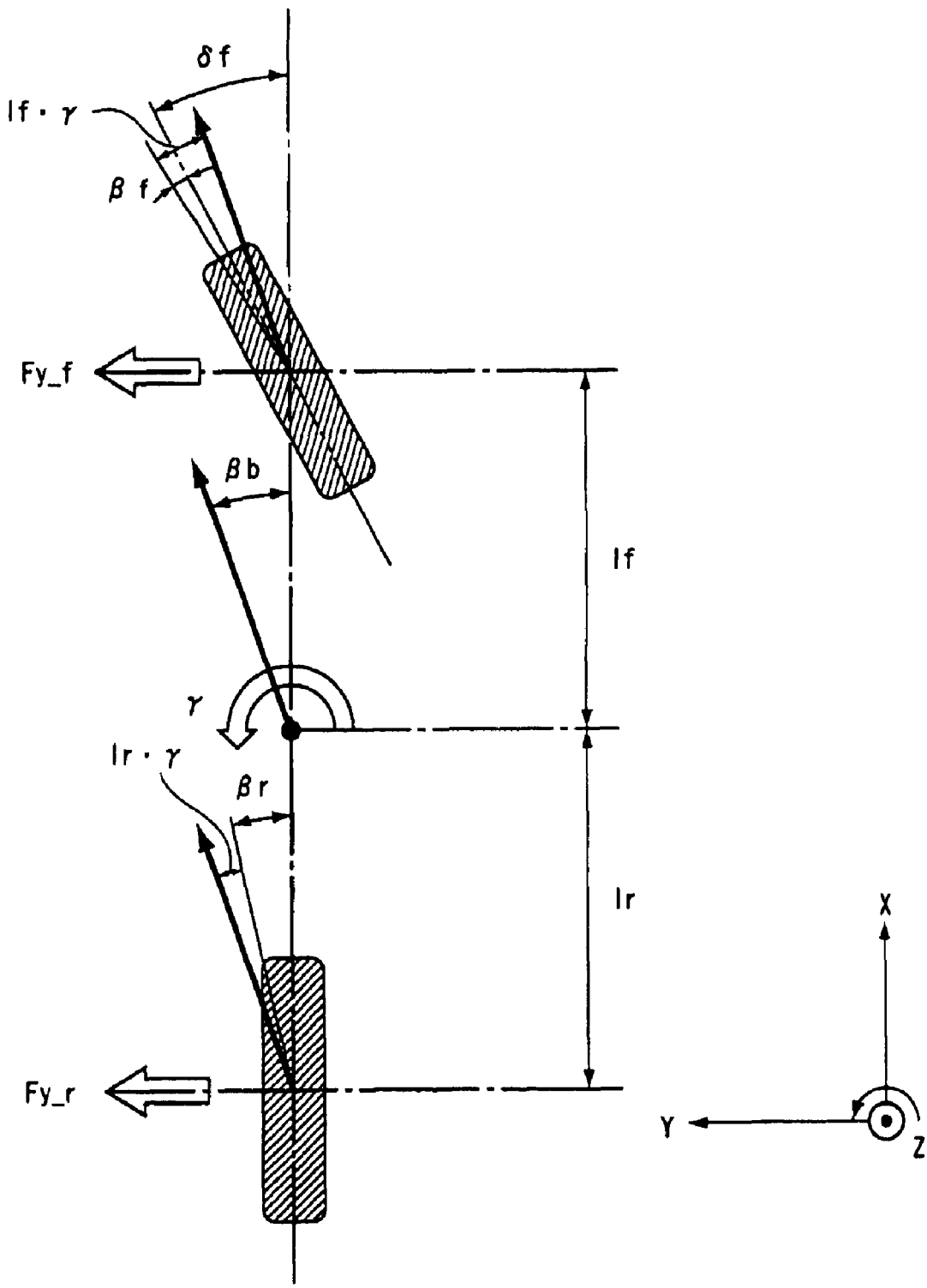
FIG. 7 is an explanatory diagram showing the two-wheel drive model.
Figure 8:
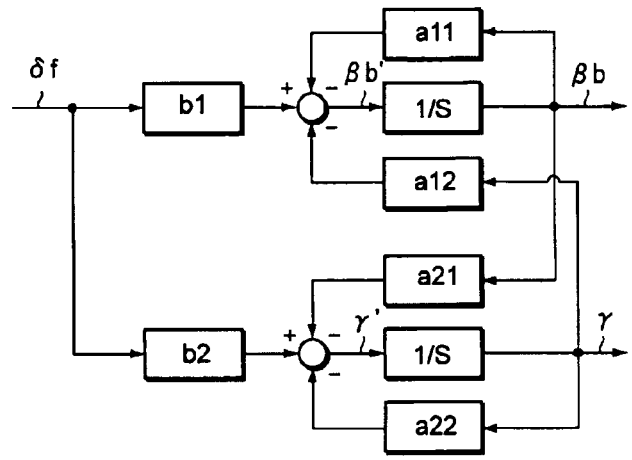
FIG. 8 is a block diagram showing the equations of state for vehicle motion.

FIG. 7 is an explanatory diagram of a vehicle model. The vehicle model shown in this figure is a two-wheel model to represent the state of motion of the vehicle in terms of a front wheel and a rear wheel. In this vehicle model, the state of motion of the vehicle is expressed in terms of the rotational motion (the yaw motion) around the vertical axis (the Z axis), and the translational motion in the lateral direction (the Y axis). When the front wheel is steered (and the rear wheel is parallel to the X axis), the state of motion of the vehicle is expressed by the following equations of state:

$$\begin{bmatrix} \beta b' \\ \gamma' \end{bmatrix} = \begin{bmatrix} -a11 & -a12 \\ -a21 & -a22 \end{bmatrix} \begin{bmatrix} \beta b \\ \gamma \end{bmatrix} + \begin{bmatrix} b1 & 0 \\ b2 & 0 \end{bmatrix} \begin{bmatrix} \delta f \\ 0 \end{bmatrix} \quad (35)$$

where βb is a vehicle body sliding angle (hereinafter referred to as a body sliding angle), γ is a yaw rate, and δf is a front wheel steering angle. In the present application, the addition of an apostrophe symbol to any state variable indicates the derivative of that state variable with respect to time. For example βb' indicates a body sliding angular velocity, which is the time derivative of the body sliding angle βb, and γ' indicates an yaw angular acceleration, which is the time derivative of the yaw rate γ. The equations of state in Eq. (35) are shown by the block diagram in FIG. 8. This block diagram includes a block where the integral (indicated by "1/s") is an element, and shows the change of these equations of state (the state of motion of the vehicle) over time.

The system matrix for the equations has elements a11-a22 and b1 and b2, which are expressed as in Eq. (36):

$$a11 = \frac{2(kf\_a + kr\_a)}{M \cdot V}$$
$$a12 = 1 + \frac{2(lf \cdot kf\_a - lr \cdot kr\_a)}{M \cdot V^2}$$
$$a21 = \frac{2(lf \cdot kf\_a - lr \cdot kr\_a)}{Iz}$$
$$a22 = \frac{2(lf^2 \cdot kf\_a + lr^2 \cdot kr\_a)}{Iz \cdot V}$$
$$b1 = \frac{2kf\_a}{M \cdot V}$$
$$b2 = \frac{2lf \cdot kf\_a}{Iz}$$

(36)

where V is a velocity, M is a mass of the vehicle, lf is the distance between the center of mass and the front wheel axle, lr is the distance between the center of mass and the rear wheel axle, Iz is a moment of inertia of the vehicle around the Z axis of rotation, and ka is a cornering power including nonlinearities of the vehicle wheels. In addition, kf_a denotes the cornering power ka of the front wheels, and kr_a denotes the cornering power of the rear wheels. For the case of a four-wheel vehicle, a quantity for the front wheels indicated by the letter "f" (or the rear wheels indicated by the letter "r") can be regarded as the average of that for the left and right front wheels (or the left and right rear wheels).

The cornering power ka is the rate of change of a cornering force with respect to an infinitesimal change in a sliding angle of the wheel (hereinafter referred to as a wheel sliding angle) βw, where the cornering force is a component of a frictional force along the direction perpendicular to the direction of travel of the wheel, the frictional force being generated at the surface the wheel contracts during turning by the wheel sliding angle βw. That is, the cornering power ka is the slope (the derivative) of the cornering force at the wheel sliding angle βw. This cornering power ka is a parameter that has a large effect on the stability of the vehicle: when this value is large, the response is quick to a change in steering, but when this value is small, the response is slow to a change in steering.

Figure 9:
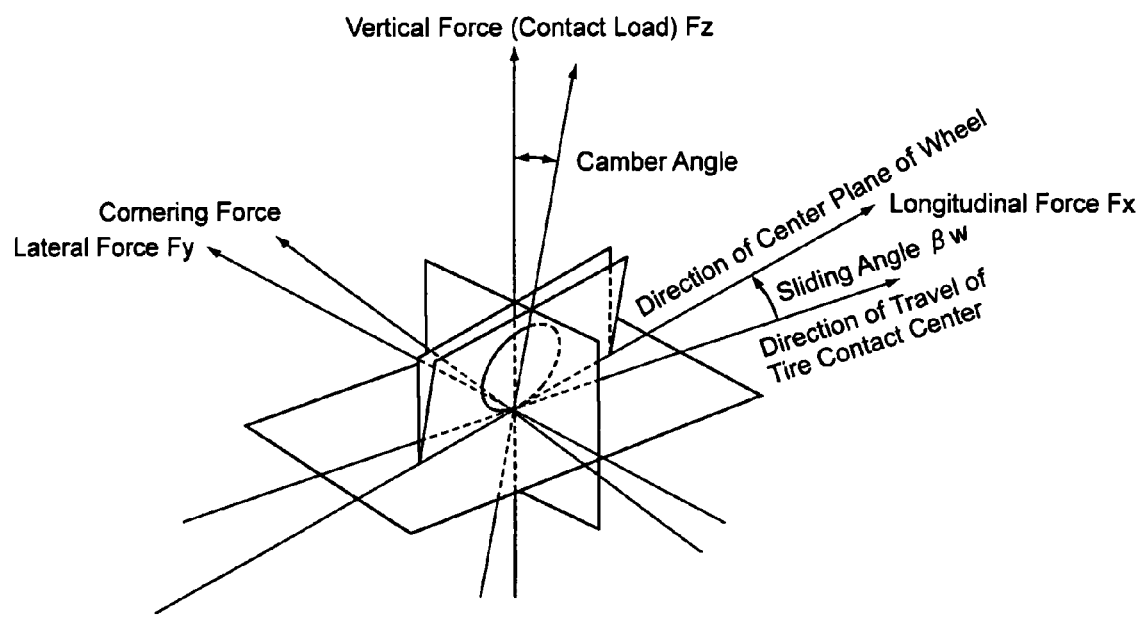
FIG. 9 is an explanatory diagram showing the forces acting on a vehicle.

FIG. 9 is an explanatory diagram of the forces acted on the wheel. The forces acted on the wheel include the cornering force described above, a longitudinal force Fx, a lateral force Fy, a vertical force Fz and so on. When turning by the wheel sliding angle βw, the component of the frictional force along the direction parallel to the plane of the center of the wheel is the longitudinal force Fx, the component of the frictional force along the direction perpendicular to the plane of the center of the wheel is the lateral force Fy, and the vertical force Fz is the load in the vertical direction, called a vertical load.

Among the forces acted on the wheel listed above, the cornering force and the lateral force Fy may be regarded as similar forces. While these forces are not strictly identical, there is a tendency for these forces to be approximately equal in the entire range of the wheel sliding angle βw. In the present application, the cornering force and the lateral force Fy are regarded as essentially the same. The relationship between the lateral force Fy and the cornering power ka is described below.

The lateral force Fy can be expressed as in Eq. (37) in a quadratic form of the vehicle sliding angle βw, through the use of the tire model (a quadratic approximation model) of "Fiala" that can take into account the effect of nonlinearities:

$$Fy = k \cdot \beta w - \frac{k^2}{4Fy\max} \cdot \beta w^2$$ (37)

In this case, the vehicle cornering power ka satisfies the relationship expressed as follows:

$$ka = \frac{\partial Fy}{\partial \beta w} = k - \frac{k^2}{2Fy\max} \cdot |\beta w|$$ (38)

That is, the cornering power ka is the rate of change (the differential) of the lateral force Fy with respect to an infinitesimal change in the vehicle sliding angle βw.

In Eqs. (37) and (38), the coefficient k is a constant that can be obtained experimentally, known as a reference cornering power. This reference cornering power k represents the characteristics of the wheel, and varies depending on the friction coefficient μ between the road surface and the wheel and also on the vertical force Fx. Specifically, a large value of k indicates that the wheel has high stiffness, and a small value of k indicates that the stiffness of the wheel is low. The reference cornering power k is defined as the rate of change (the differential value) of the lateral force Fy at the point where the wheel sliding angle βw is 0, and is expressed as:

$$k = \frac{\partial Fy}{\partial \beta w}\bigg|_{\beta w=0}$$ (39)

Further, a lateral force maximum value Fymax, which is the maximum value of the lateral force Fy, is calculated uniquely based on the vertical force Fz, the longitudinal force Fx, and the friction coefficient μ as shown in Eq. (40):

$$Fy\max = \sqrt{\mu^2 \cdot Fz^2 - Fx^2}$$ (40)

By considering the nonlinearities of the wheel, the elements a11-b2 can be rewritten as in Eq. (41):

$$a11 = \frac{1}{M \cdot V}\left\{\underbrace{2(kf + kr)}_{\text{Linear Term}} - \underbrace{\left(\frac{kf^2}{Ff\_y\max} \cdot |\beta f| + \frac{kr^2}{Fr\_y\max} \cdot |\beta r|\right)}_{\text{Nonlinear Term}}\right\}$$

$$a12 = 1 + \frac{1}{M \cdot V^2}$$
$$\left\{\underbrace{2(lf \cdot kf - lr \cdot kr)}_{\text{Linear Term}} - \underbrace{\left(\frac{lf \cdot kf^2}{Ff\_y\max} \cdot |\beta f| - \frac{lr \cdot kr^2}{Fr\_y\max} \cdot |\beta r|\right)}_{\text{Nonlinear Term}}\right\}$$

$$a21 = \frac{1}{Iz}\left\{\underbrace{2(lf \cdot kf - lr \cdot kr)}_{\text{Linear Term}} - \underbrace{\left(\frac{lf \cdot kf^2}{Ff\_y\max} \cdot |\beta f| - \frac{lr \cdot kr^2}{Fr\_y\max} \cdot |\beta r|\right)}_{\text{Nonlinear Term}}\right\}$$

(41)

-continued $$a22 = \frac{1}{Iz \cdot V}\left\{\underbrace{2(lf^2 \cdot kf + lr^2 \cdot kr)}_{\text{Linear Term}} - \underbrace{\left(\frac{lf^2 \cdot kf^2}{Ff\_y\max} \cdot |\beta f| + \frac{lr^2 \cdot kr^2}{Fr\_y\max} \cdot |\beta r|\right)}_{\text{Nonlinear Term}}\right\}$$

$$b1 = \frac{1}{M \cdot V}\left\{2kf - \frac{kf^2}{Ff\_y\max} \cdot |\beta f|\right\}$$

$$b2 = \frac{lf}{Iz}\left\{2kf - \frac{kf^2}{Ff\_y\max} \cdot |\beta f|\right\}$$

In the above equations, kf is an equivalent cornering power of the front wheel when the elastic deformation of the suspension is taken into account for the front wheel reference cornering power, and kr is an equivalent cornering power of the rear wheel when the elastic deformation of the suspension is taken into account for the rear wheel reference cornering power. In addition, βf is a front wheel sliding angle, and is the average value of the left and right front wheel sliding angles βw (termed "average front wheel sliding angle"), and βr is the rear wheel sliding angle, and is the average value of the left and right rear wheel sliding angles βw (termed "average rear wheel sliding angle"). These sliding angles βf and βr are expressed as follows:

$$\beta f = \beta b + \frac{lf}{V} \cdot \gamma - \delta f \quad (42)$$

$$\beta r = \beta b - \frac{lr}{V} \cdot \gamma$$

The elements a11 and a22, which are diagonal elements in the system matrix, are parameters that have an impact on the stability of the vehicle (the degree of vehicle behavior convergence). In particular, the element a11 autonomously stabilizes the lateral motion, and the element a22 autonomously stabilizes the yawing behavior. Additionally, the elements a12 and a21, which are off-diagonal elements in the system matrix, are parameters that have an impact on improving the response of the vehicle (the degree of vehicle behavior variation). When the elements a12 and a21 are relatively small as compared to the elements a11 and a22, the stability of the vehicle at high speed is improved. In contrast, when the elements a12 and a21 are relatively large as compared to the elements a11 and a22, the response of the vehicle to steering is improved. The elements b1 and b2 are the gain of the vehicle behavior to steering by the driver, and are adjustable via the steering gear ratio, for example.

In the present embodiment, an ideal vehicle is considered to be the one with the vehicle behavior characteristics that are robust to changes in the driving environment. Thus, of the elements a11-b2, the primary goal of control is to suppress changes in the elements a11-a22. When the elements a11-a22 are obtained analytically, each of the elements a11-a22 is expressed as a sum of the terms that are dependent on the vehicle mass M, the various dimensions of the vehicle such as a wheel base, and the equivalent cornering powers kf and kr, and of the terms that are dependent on the average front and rear sliding angles βf and βr, the vertical force Fz, and the friction coefficient μ, as shown in Equation 41. In other words, each of the elements a11-a22 is expressed in terms of a linear term, which changes with the linear properties of the wheel, and the nonlinear term, which changes with the nonlinear properties of the wheel. When the elements a11-a22 change due only to the linear terms, the behavior of the wheels exhibits linear characteristics, and thus there are no particular problems from the perspective of stability. However, when the elements a11-a22 change due to the nonlinear terms as well, the behavior of the wheels exhibits nonlinear characteristics, which may interfere with steering. Based on the knowledge that the changes in the nonlinear terms are caused by the driving force distribution ratio between the front and rear wheels, the driving force distribution ratio between the front and rear wheels may be adjusted to reduce the absolute values of the nonlinear terms from the current values (the absolute values of the current values) preferably to 0. By minimizing the nonlinear terms in this way, the effects of the nonlinear terms in the elements a11-a22 are reduced, and the variations in the elements a11-a22 are suppressed.

In the following, the total driving force, which is the sum of the driving forces applied to the wheels, is denoted by fa, and the driving force distribution ratio is denoted by r. Then, a front wheel longitudinal force Ff_x, which is the average of the longitudinal forces Fx for the left and right front wheels (termed "front wheel average longitudinal force") and a rear wheel longitudinal force Fr_x, which is the average of the longitudinal force Fx for the left and right rear wheels (termed "rear wheel average longitudinal force") are expressed as follows:

$$Fa = 2(Ff\_x + Fr\_x) \quad (43)$$

$$Ff\_x = r \cdot \frac{Fa}{2}$$

$$Fr\_x = (1-r) \cdot \frac{Fa}{2}$$

Minimizing the Nonlinear Term in Element a11

Figure 10:
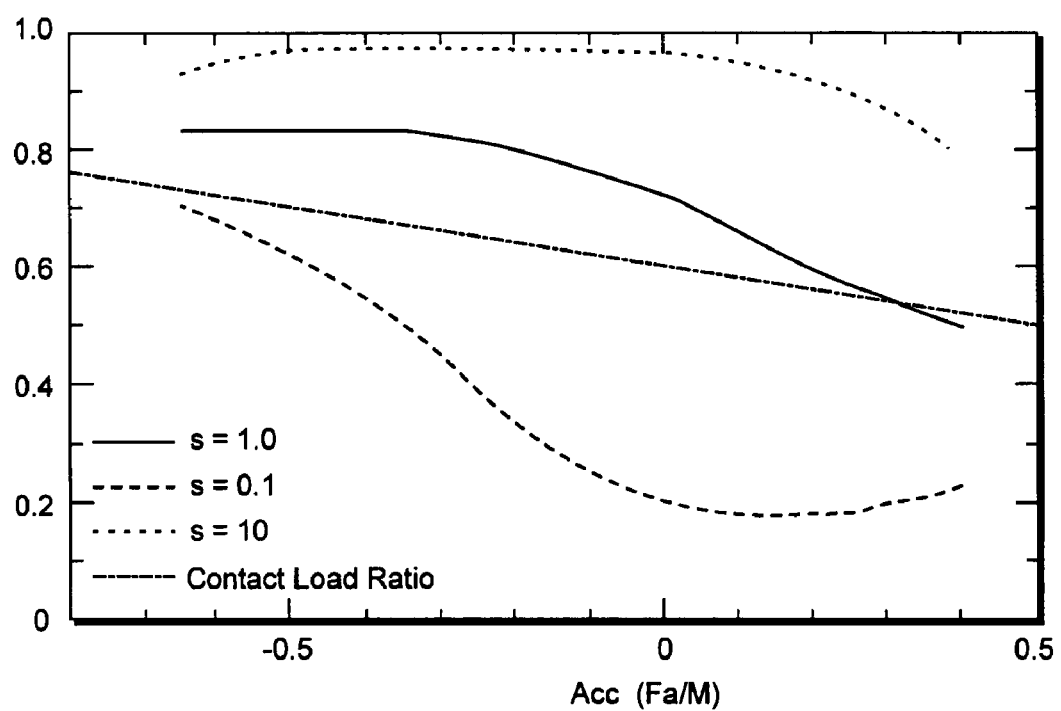
FIG. 10 is a graph showing the trends in the driving force distribution ratios that minimize the nonlinear term in the element a11.

FIG. 10 is an explanatory graph showing the trends of the driving force distribution ratio r that minimizes the nonlinear term in the element a11. The nonlinear term in the element a11 is a linear combination of the absolute value of the average front wheel sliding angle βf and the absolute value of the average rear wheel sliding angle βr. For the sake of clarity, in the below the average rear wheel sliding angle βr is expressed as s times the average front wheel sliding angle βf (where this factor s is called a "wheel sliding angle ratio"). FIG. 10 illustrates the relationship between a body acceleration Acc (defined as the total driving force Fa/vehicle mass M) and the driving force distribution ratio r for specific wheel sliding angle ratios (s=0.1, 1.0, 10) under the condition of a constant friction coefficient (for example, μ=0.9). (This condition is also true for FIGS. 12 and 13 later.) As indicated in Eqs. (40), (41) and (42), the trends shown in this figure can be obtained based on the friction coefficient μ, the total driving force Fa, an average value Ff_z of the vertical forces Fz on the left and right front wheels (termed "front wheel average vertical force"), an average value Fr_z of the vertical forces Fz on the left and right rear wheels (termed "rear wheel average vertical force") for individual wheel sliding angle ratio s. For example, the values of the nonlinear term are calculated according to the different driving force distribution ratios r, and the driving force distribution ratio r that gives the smallest absolute value of the nonlinear term may be selected. If the wheel sliding angle ratio s is 1.0, the driving force distribution ratio r is in a range between about 0.5 and 0.8, with more weight on the front wheels. If the wheel sliding angle ratio s is less than 1.0, there is a tendency towards having more weight on the rear wheels. If the wheel sliding angle ratio s is greater than 1.0, there is a tendency towards having more weight on the front wheels than the case of the wheel sliding angle ratio s equal 1.0.

Minimizing the Nonlinear Terms in the Elements a12 and a21

Figure 11:
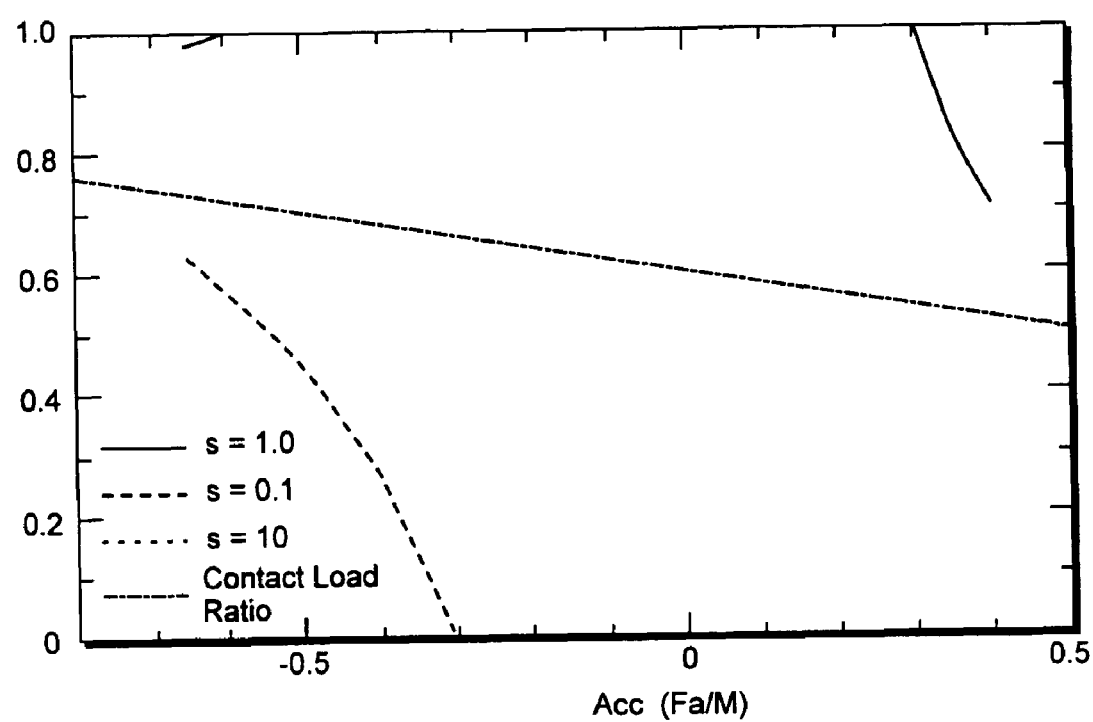
FIG. 11 is a graph showing the trends in the driving force distribution ratios that minimize the nonlinear terms in the elements a12 and a21.

FIG. 11 is an explanatory graph showing the trends of the driving force distribution ratio r that minimizes the nonlinear terms in the elements a12 and a21. Each of the nonlinear terms in the elements a12 and a21 is a linear combination of the absolute value of the average front wheel sliding angle βf and the absolute value of the average rear wheel sliding angle βr, and both are expressed by identical polynomials. The trends shown in FIG. 11 are obtained uniquely based on the parameters described above, in the same manner as for the element a11. Specifically, if the wheel sliding angle ratio s is 1.0, the driving force distribution ratio r is greater than about 0.7, showing an even greater tendency of having weight on the front wheels than in the case of the element a11. On the other hand, if the wheel sliding angle ratio s is less than 1.0, the tendency is for the weight to be more on the rear wheels than in the case of the wheel sliding angle ratio s equal 1.0. If the wheel sliding angle ratio s is greater than 1.0, there is no solution between 0.0 and 1.0.

Minimizing the Nonlinear Term of Element a22

Figure 12:
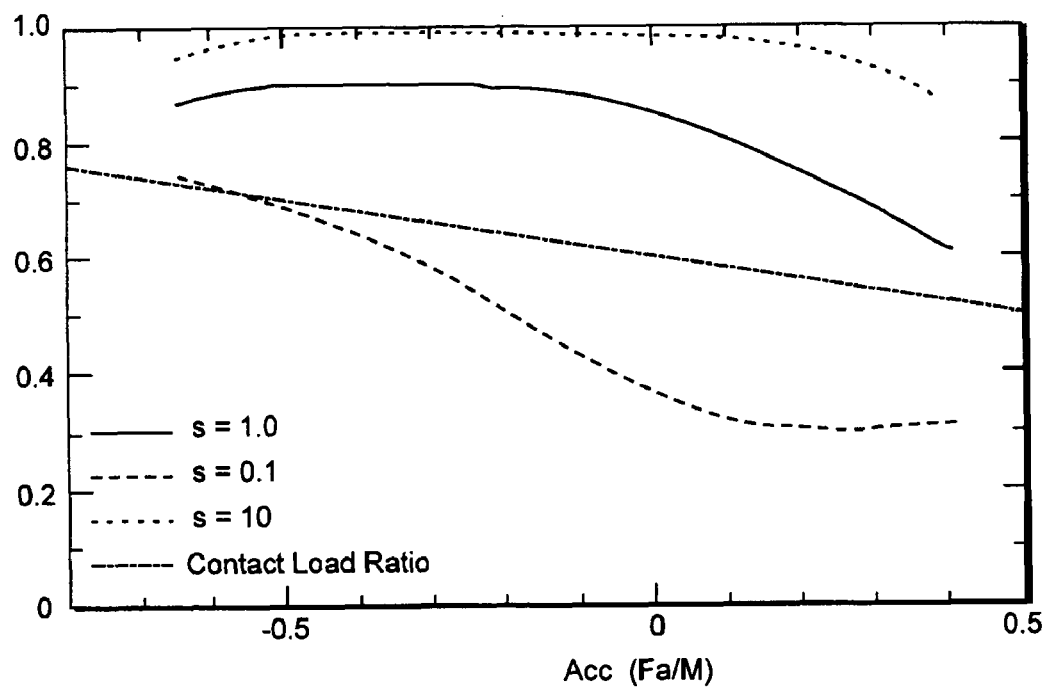
FIG. 12 is a graph showing the trends in the driving force distribution ratios that minimize the nonlinear term in the element a22.

FIG. 12 is an explanatory graph showing the trends of the driving force distribution ratio r that minimizes the nonlinear term in the element a22. The nonlinear term in the element a22 is a linear combination of the absolute value of the average front wheel sliding angle βf and the absolute value of the average rear wheel sliding angle βr. The trends shown in FIG. 12 are obtained uniquely in the same manner as for the elements a11-a12, based on the friction coefficient μ, the total driving force Fa, and the front and rear average vertical forces Ff_z and Fr_z. Specifically, overall, there is a greater tendency of having weight on the front wheels than in the case of the element a11.

Any one of the elements a11 to a22 may be selected for minimizing the nonlinear term. Note that the average front wheel sliding angle βf and the average rear wheel sliding angle βr, included in the nonlinear terms, are difficult to measure precisely in actual measurements; thus, it is difficult to reflect these values βf and βr in the control system. Therefore, in the range where the wheel sliding angle βw is small, the front and rear wheel lateral forces Ff_y and Fr_y, which are detectable, are substituted, respectively, for the average front wheel sliding angle βf and average rear wheel sliding angle βr, based on the observation that the arithmetic product of the reference cornering power (the equivalent cornering power) k and the wheel sliding angle βw corresponds to the lateral force Fy. In other words, the nonlinear term in each of the elements a11 to a22 is expressed based on the set of parameters described above, those parameters being μ, Fa, Ff_z and Fr_s along with an average value of the left and right front wheel lateral forces Fy (termed "front wheel average lateral force" Ff_y), and an average value of the left and right rear wheel lateral forces Fy (termed "rear wheel average lateral force" Fr_y). The resultant nonlinear term of the element a11 is given in Eq. (44):

$$kf \cdot \frac{|Ff\_y|}{\sqrt{\mu^2 \cdot Ff\_z^2 - r^2 \cdot \frac{Fa^2}{4}}} + kr \cdot \frac{|Fr\_y|}{\sqrt{\mu^2 \cdot Fr\_z^2 - (1-r)^2 \cdot \frac{Fa^2}{4}}} \quad (44)$$

Similar substitutions can be made for the nonlinear terms of the other elements a12-a22. The detailed explanations are omitted here because the fundamental concepts are the same, except to note that the driving force distribution ratios r that minimizes the nonlinear term in each of the elements a12-a22 can be obtained also based on the friction coefficient μ, the front and rear wheel average vertical forces Ff_z and Fr_z, the front and rear wheel average lateral forces Ff_y and Fr_y and the total driving force Fa.

Figure 13:
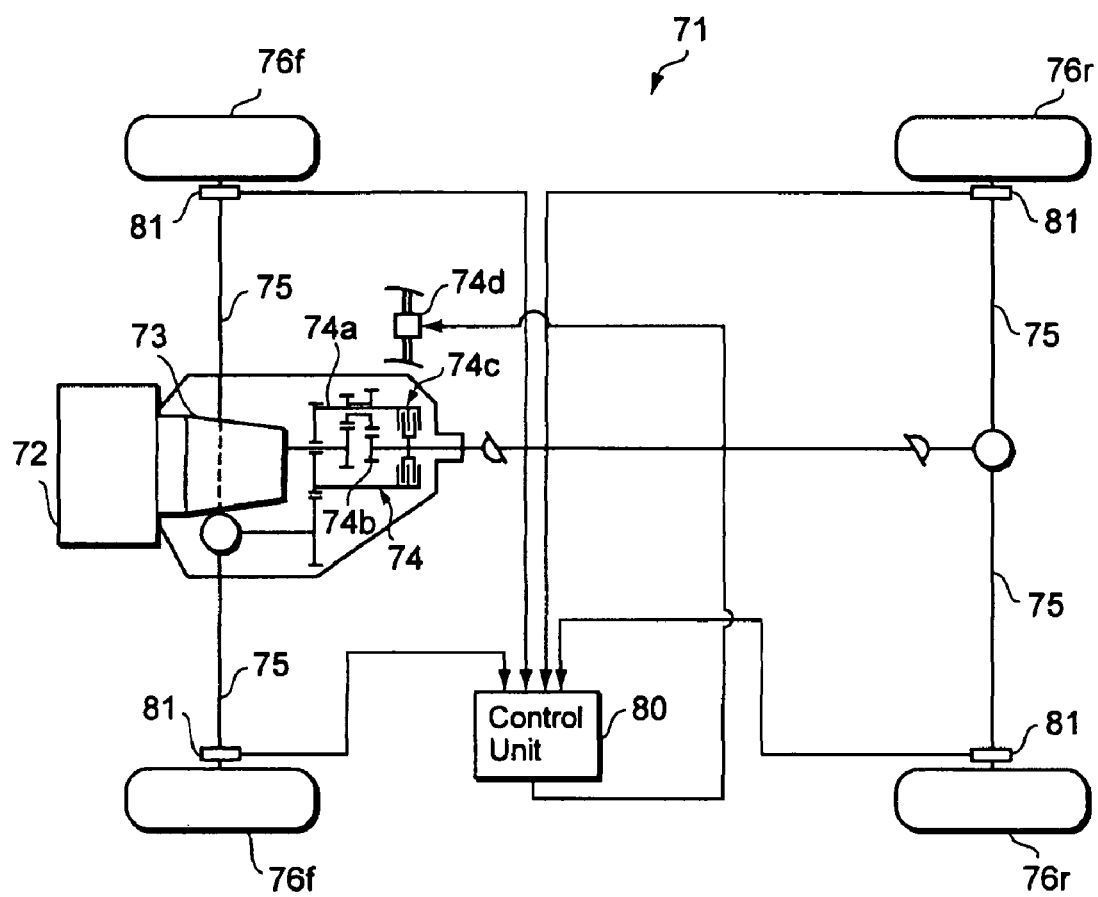
FIG. 13 is a block diagram illustrating the overall structure of a vehicle motion control device.

The system configuration of the vehicle motion control device according to the present embodiment is explained below based on the conceptual explanation given above. FIG. 13 is an explanatory diagram of a vehicle to which the vehicle motion control device 71 according to the present embodiment is applied. This vehicle is a four-wheel drive vehicle, driven by both the front and rear wheels. The driving force from a crank shaft (not shown) of an engine 72 is transmitted through an automatic transmission 73 and a center differential device 74 to front wheel and rear wheel drive axles 75. When the driving force is transmitted to the drive axles 75, rotational torques are applied to the front wheels 76f and the rear wheels 76r, causing the front wheels 76f and rear wheels 76r to rotate, thereby producing the driving forces for the front and rear wheels 76f and 76r. Note that in the present embodiment a simple term "wheels 76" is used to indicate the front wheels 76f and the rear wheels 76r.

The center differential device 74 is a compound planetary gear-type differential control device. Between the two output sections of the center differential device 74, that is, between the front wheel-side output section (a carrier 74a) and the rear wheel-side output section (a sun gear 74b), a hydraulic multi-board clutch 74c is provided. In this hydraulic multi-board clutch 74c, the automatic engagement status can be adjusted through adjusting the hydraulic pressure using a solenoid valve 74d (i.e., through increasing, maintaining, or decreasing the hydraulic pressure). When the hydraulic multi-board clutch 74c is disengaged, the differential movement of the front and rear drive axles 75 occurs, and thus the driving force distribution ratio r depends on the value predetermined by the center differential device 74 (for example, r=0.35). On the other hand, when the hydraulic multi-board clutch 74c is fully engaged, the differential movement of the front and rear drive axles 75 is suppressed, giving rise to the driving force distribution ratio r corresponding to the state where the front and rear drive axles 75 are rigidly connected. In other words, the driving force distribution ratio r is varied by the state of engagement of the hydraulic multi-board clutch 74c.

Figure 14:
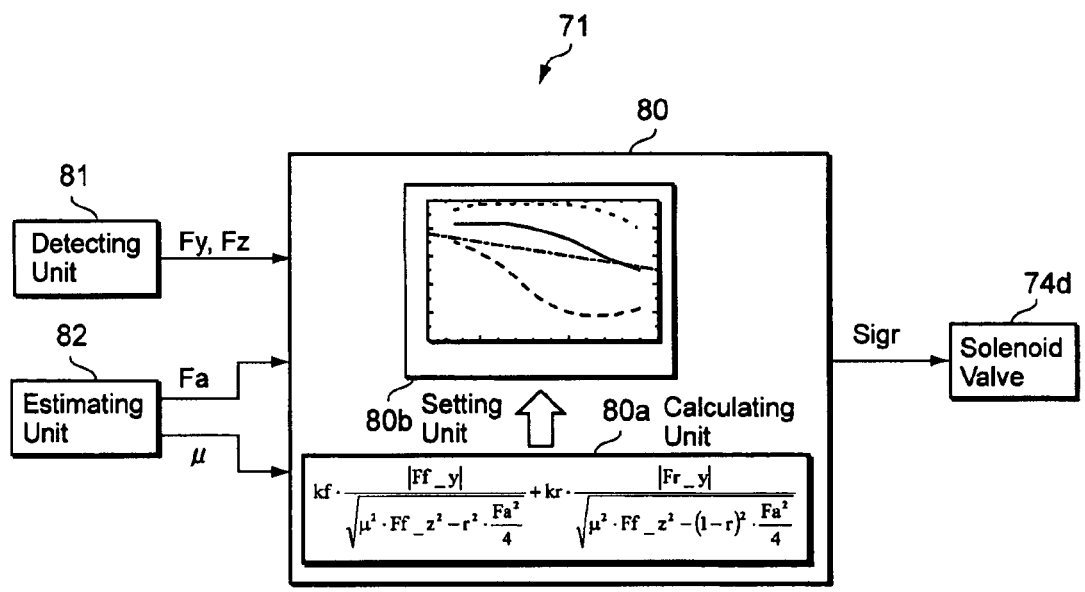
FIG. 14 is a block diagram showing the process flow of the vehicle motion control device.

FIG. 14 is a block diagram showing the overall structure of the vehicle motion control device 71. The vehicle motion control device 71 comprises a control unit 80, which may be a microcomputer comprising a CPU, a ROM, a RAM, and an I/O interface. The control unit 80 performs calculations pertaining to the vehicle motion control through a control program stored in the ROM. Functionally, the microcomputer as the control unit 80 comprises a calculating unit 80a and a setting unit 80b. In the present embodiment, the calculating unit 80a obtains the nonlinear terms of the elements of the system matrix (a11 is chosen in the present embodiment). The setting unit 80b obtains a target driving force distribution ratio r' with the above nonlinear terms obtained. In order to perform these calculations, the control unit 80 receives not only detection signals from a variety of sensors, including a detecting unit 81, but also a variety of values (the friction coefficient μ and the total driving force Fa in the present embodiment) estimated by an estimating unit 82 (not shown in FIG. 13).

The detecting unit 81 comprises sensors for detecting forces applied to the wheels 76. In FIG. 14, only a single block is shown for the detecting unit 81 for convenience, but actually the detecting unit 81 is provided for each of the four wheels 76. Each of the detecting units 81 can individually detect the longitudinal force Fx, the lateral force Fy and the vertical force Fz. The detecting unit 81 comprises a strain gauge and a signal processing circuit that generates detection signals according to the applied force through processing the electrical signals outputted from the strain gauge. The strain that occurs in the drive axles 75 is proportional to the applied force, and the detecting unit 81 directly detects the applied force via the strain gauges embedded in the axles 75. Note that specific structures of the detecting unit 81 are described in, for example, Japanese Kokai Laid-open Publication H 04-331336 and Japanese Kokai Laid-open Publication H 10-318862. The entire disclosures of Japanese Kokai Laid-open Publications H 04-331336 and 1-10-318862 are incorporated herein by reference. The estimating unit 82, as described below, estimates the friction coefficient μ a and the total driving force Fa based on the detection results from a variety of sensors, not shown.

Figure 15:
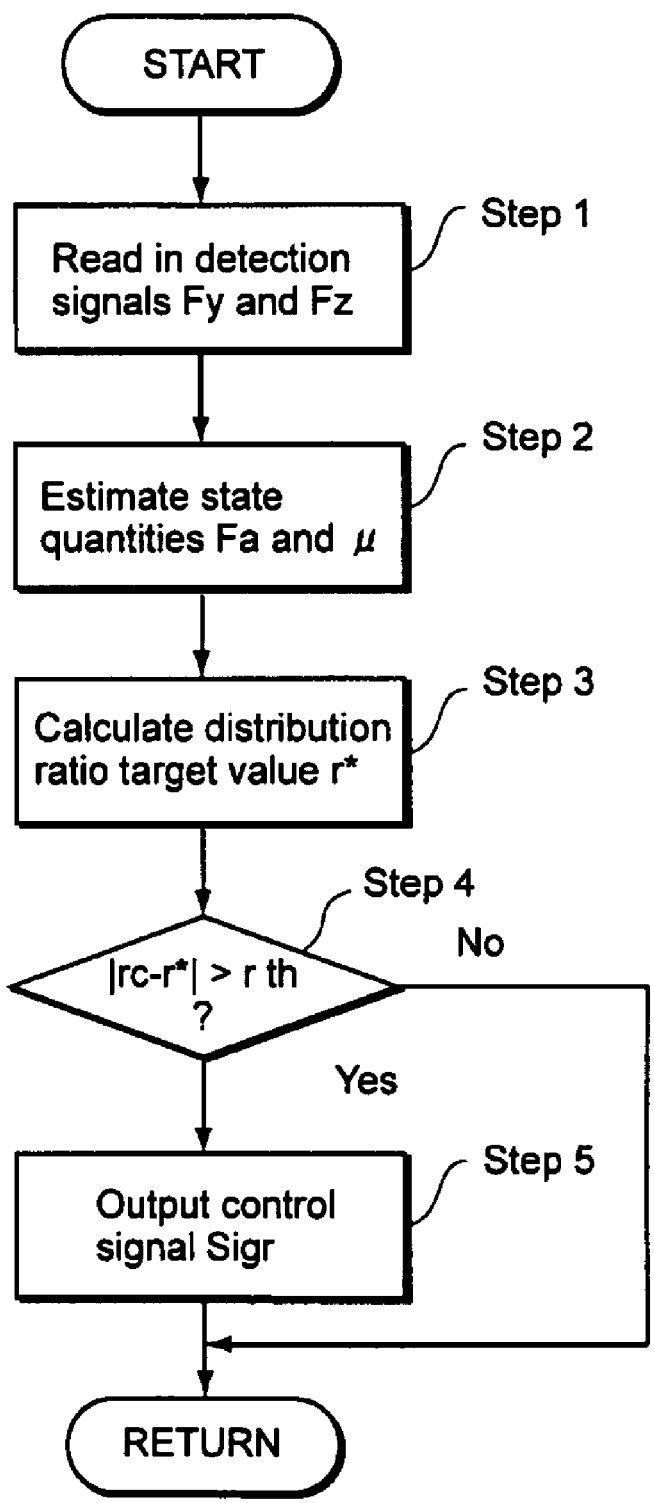
FIG. 15 is a flowchart showing the procedures according to the vehicle motion control.

FIG. 15 is a flowchart showing the vehicle control sequence according to the present embodiment. The procedure shown in this flowchart is called at specific intervals, and is executed by the vehicle motion control device 71. First, in Step 1, the various detection signals are read in. The detection values that are read in at this Step 1 include the forces applied to each of the wheels 76 (the lateral force Fy and the vertical force Fz).

The friction coefficient μ and the total driving force Fa are estimated in Step 2. One well-known method for estimating the friction coefficient is, for example, based on the vehicle motion model wherein the behavior of the vehicle is modeled based on the vehicle motion theory. In this method, the actual state of motion of the vehicle (for example, the sliding angle) is used as the basis for estimating the current friction coefficient μ, by comparing between the state of motion in the vehicle motion model that assumes a high μ road and the state of motion in the vehicle motion model that assumes a low μ road. The details of this type of method for estimating the friction coefficient μ are disclosed in, for example, Japanese Kokai Laid-open Publication 200-071968. In addition, the friction coefficient μ may be estimated based on the acceleration and the difference in velocity between two of the wheels 76, as disclosed in, for example, Japanese Kokai Laid-open Publication 2003-237558. Moreover, as disclosed in Japanese Kokai Laid-open Publication 2002-27882, the friction coefficient μ may be estimated by incorporating the conditions of the road surface, detected by a camera, in the state of motion of the vehicle. As seen above, a wide variety of methods may be used to estimate the friction coefficient μ, based on the state of the vehicle, in the present embodiment. Here, the state of the vehicle is represented by the sliding angle, the yaw rate, the wheel velocity, the state of the road surface contacted by the wheels 76, and the like. The entire disclosures of Japanese Kokai Laid-open Publications 200-071968, 2003-237558, and 2002-27882 are incorporated herein by reference.

The total driving force Fa is obtained based on the torque outputted from the engine 72 according to the engine rotation number, and on the torque outputted from the automatic transmission 73 according to the shift position and the like. Specifically, the velocity ratio of the torque converter is calculated based on the engine rotation number and the turbine rotation number of the torque converter in the automatic transmission 73. Based on the results, a map showing the relationship between the velocity ratio of the torque converter and a pump capacity coefficient is referenced to determine the pump capacity coefficient corresponding to the calculated velocity ratio. Moreover, a torque ratio, which is defined as the ratio between the torque on the input side of the torque converter and the torque on the output side of the torque converter, corresponding to the calculated velocity ratio of the torque converter is determined with reference to a map showing the relationship between the velocity ratio of the torque converter and the torque ratio.

Thereafter, a pump torque is calculated based on the pump capacity coefficient that has been determined and on the engine rotation number. Then, a turbine torque, outputted from the turbine, is calculated based on the pump torque and the torque ratio. Moreover, an output torque of the automatic transmission 73 is calculated by multiplying the turbine torque by the gear ratio corresponding to the current gear position. Finally, a driving torque is calculated by multiplying the output torque of the automatic transmission 73 by the final gear ratio of the automatic transmission 73. Thus the total driving force Fa is calculated based on the radius of the wheels and the driving torque.

The driving force distribution ratio target value r* is calculated in Step 3. The driving force distribution ratio r that minimizes the nonlinear term in element a11 can be obtained using Eq. (44). Specifically, the driving force distribution ratio r is varied in a stepwise manner between 0.00 and 1.00, and the values of the nonlinear term are sequentially calculated using the friction coefficient μ, the total driving force Fa, the average vertical forces Ff_z and Fr_z of the front and rear wheels 76f and 76r, and the average lateral forces Ff_y and Fr_y of the front and rear wheels 76f and 76r. The driving force distribution ratio r that yields the smallest of the calculated nonlinear term values is set as the target value r*. Note that the average lateral forces Ff_y and Fr_y for the front and rear wheels 76f and 76r and the average vertical forces Ff_z and Fr_z for the front and rear wheels 76f and 76r can be determined uniquely based on the respective detected values (of the lateral force Fy and the vertical force Fz) for each of the wheels 76.

In Step 4, the current value rc of the driving force distribution ratio r is compared to the target value r* to determine whether or not the difference between these values is greater than a threshold value rth. This threshold value rth is predetermined, through experiments and simulations, to be the maximum value of the difference between a specific current value rc and the target value r*, the specific current value rc being the value at which control is regarded as not necessary from the perspective of suppressing hunting in control. If the answer is yes in Step 4, or in other words, if the difference between the two values is greater than the threshold value (|rc−r*|>rth), the routine proceeds to Step 5. On the other hand, if the answer is no in Step 4, or in other words, if the difference between the values is less than the threshold value rth (|rc−r*|<rth), the routine is exited without performing Step 5.

In Step 5, a map that describes the relationship between the driving force distribution ratio r and the state of engagement (the engagement torque) is referenced to output a control signal Sigr (a value that indicates the engagement torque), corresponding to the predetermined target value r*, to the solenoid valve 74d; thereafter, the routine is exited. In this way, the state of engagement of the hydraulic multi-board clutch 74c is adjusted through controlling the duty ratio of the solenoid valve 74d according to the control signal Sigr. This changes the driving force distribution ratio r from the current value rc to the target value r*.

In the present embodiment, the target value r* is determined to be the driving force distribution ratio r that minimizes the absolute value of the nonlinear term of the element a11 in the system matrix. Moreover, the center differential device 74 (more specifically, the solenoid valve 74b) is controlled to vary the driving force distribution ratio r between the front wheels 76f and rear wheels 76r based on the target value r*. Thus, the nonlinear term in the element a11 is minimized to control the nonlinear components that act on the wheels 76, thereby leading to stabilized vehicle response. Moreover, minimizing the nonlinear term suppresses the variations in the element a11, which has a strong correlation to the convergence of the vehicle body sliding angle, thereby realizing stabilized vehicle response regardless of the driving conditions.

Furthermore, the detecting unit 81 detects directly the applied forces that act on the wheels 76. Therefore, even in the "limit cornering" driving condition or while driving on a road with a low friction coefficient, the applied forces can be determined accurately. Therefore, the accuracy is improved in the calculations of the nonlinear term of the element a11, and more effective control of the state of motion of the vehicle is achieved.

Note that in the present embodiment, the driving force distribution ratio r that minimizes the nonlinear term was uniquely determined to be the target value r*. However, from the perspective of stability in control, it is adequate to set the target value r* so as to make the absolute value of the nonlinear term only smaller than the current absolute value. For example, the current driving force distribution ratio r may be changed by only a step value. Even in this method, the nonlinear components that act on the wheels 76 will be more controlled than in the current situation, making it possible to obtain stabilized vehicle response. This type of alternate method regarding the minimization of nonlinear terms can be employed similarly in the other embodiments described later.

In the present embodiment, from the perspective that measuring the average front wheel sliding angle βf and the average rear wheel sliding angle βr is difficult, the average lateral forces Ff_y and Fr_y of the front and rear wheels are substituted in obtaining the driving force distribution ratio r. However, as can be seen from the nonlinear terms in Eq. (41), the nonlinear terms may be calculated using the set of parameters comprising μ, Fa, Ff_z, and Fr_z and the average front and rear sliding angles βf and βr. In this case, the average front and rear sliding angles βf and βr may be determined uniquely based on Eq. (42) by detecting the vehicle body sliding angular velocity βb' and integrating it in the estimating unit 82.

Third Embodiment

In the second embodiment, the values of the nonlinear term were calculated while varying the driving force distribution ratio r from 0.00 to 1.00 in a stepwise manner in Eq. (44) to thereby determine the target value r* which is the driving force distribution ratio r that yields the smallest of the calculated nonlinear term values. However, in Eq. (44) there are some cases wherein the value in the square root becomes negative, so that it is not possible to obtain the driving force distribution ratio r. Therefore, in actual control, it is preferable to determine the driving force distribution ratio r using the following expression:

$$kf \cdot \frac{|Ff\_y|}{\sqrt{\mu^2 \cdot Ff\_z^2 - \left(Ff\_Lim - \frac{r}{2} \cdot Ff\_div\right)^2}} + \quad (45)$$

$$kr \cdot \frac{|Fr\_y|}{\sqrt{\mu^2 \cdot Fr\_z^2 - \left(Ff\_Lim - \frac{1-r}{2} \cdot Fr\_div\right)^2}}$$

where Ff_Lim is a per-wheel maximum value of the driving force applied to the front wheels 76f (hereinafter termed "front wheel maximum value"), which is the product of the friction coefficient μ and the per-wheel vertical force Ff_z for the front wheels 76f; and Fr_Lim is a per-wheel maximum value of the driving force applied to the rear wheels 76r (hereinafter termed "rear wheel maximum value"), which is the product of the friction coefficient μ and the per-wheel vertical force Fr_z for the rear wheels 76r. Ff_div and Fr_div are expressed in the relationships as follows:

$$Ff\_div = \sum Ff\_Lim - \frac{Fa}{2} \quad (46)$$

$$Fr\_div = \sum Fr\_Lim - \frac{Fa}{2}$$

Note that since Ff_Lim and Fr_Lim are quantities separately obtained for the left and right wheels, the summation sign Σ shown in Eq. (46) indicates the sum over the two front wheels or the sum over the two rear wheels. Using the relationships in Eq. (46) is one of the methods to calculate the driving force distribution ratio r based on Eq. (45).

Although only the nonlinear term of the element a11 is shown above, similar substitutions can be made for the nonlinear terms in the other elements a11-a22 as well. Although the explanations are omitted because the fundamental concept is the same, the nonlinear terms in the elements a11-a22 are calculated using the front wheel maximum value Ff_Lim, the rear wheel maximum value Fr_Lim, the front and rear wheel average lateral forces Ff_y and Fr_y, and the parameters μ, Fa, Ff_z, and Fr_z. The use of the present method can improve reliability in control since the situation wherein there is no solution for the driving force distribution ratio r can be avoided, and the similar effects as in the second embodiment can be achieved.

Fourth Embodiment

In the third embodiment, expansion is carried out in Eq. (44) through inputting the front and rear wheel average lateral forces Ff_y and Fr_y caused by steering. Even for driving in a straight line, when additional forces (especially to the average lateral forces Fy) are applied as external noises due to unevenness of the road surfaces, crosswinds, and the like, it is possible to minimize the nonlinear terms in the elements of a11-a22 using the concept described above. However, unlike the case of steering, when driving in a straight line it is difficult to estimate the average lateral forces Ff_y and Fr_y of the front and rear wheels, and thus it is assumed that the average lateral forces Ff_y and Fr_y of the front and rear wheels are identical. In this case, the nonlinear term of the element a11 can be expressed as follows:

$$\frac{kf}{\sqrt{\mu^2 \cdot Ff\_z^2 - \left(Ff\_Lim - \frac{r'}{2} \cdot Ff\_div\right)^2}} + \quad (47)$$

$$\frac{kr}{\sqrt{\mu^2 \cdot Fr\_z^2 - \left(Ff\_Lim - \frac{1-r'}{2} \cdot Fr\_div\right)^2}}$$

Although only the nonlinear term of the element a11 is shown above, similar substitutions can be made for the nonlinear terms in the other elements a12-a22 as well. Although the explanations are omitted because the fundamental concept is the same, the nonlinear terms in the elements a11-a22 are calculated using the front wheel maximum value Ff_Lim, the rear wheel maximum value Fr_Lim, and the parameters μ, Fa, Ff_z, and Fr_z.

Fifth Embodiment

Figure 16A:
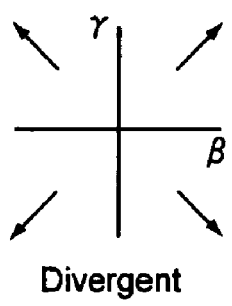
FIGS. 16A-C are explanatory diagrams showing a state surface.
Figure 16B:
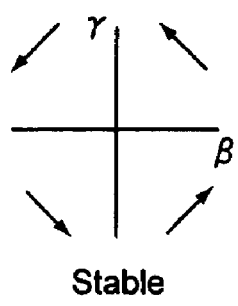
Figure 16C:
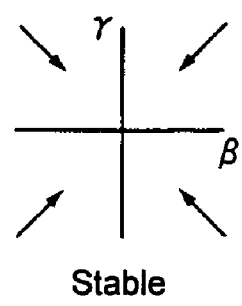

FIG. 16 is an explanatory diagram showing the state surface. The analytical method by use of the "state surface" is effective for nonlinear control systems wherein the control inputs change discretely, as in the state of motion for a vehicle that is affected by the nonlinear characteristics of the wheels, for example. For a vehicle wherein the state of motion is expressed in terms of the equation of state based on a two-wheel model, the state surface is expressed in terms of a vector field S (β'(βb, γ), γ' (βb, γ)), which has the axes representing the vehicle body sliding angle βb and the yaw rate γ. In the vector field S, the more the vectors point outwardly, the more divergent the state surface (the vehicle behavior) is; and the more the vectors point inwardly, the more non-divergent the state surface (the vehicle behavior) is. When the state surface has non-divergent tendencies, the divergence of the vehicle behavior is suppressed even when there are disturbances, thereby leading to stabilized vehicle response.

The tendency of the vectors in the vector field may be evaluated quantitatively using a characteristic value known as divergence ∇S. The divergence ∇S is the sum of the partial differential of the vehicle body sliding angular velocity βb' with respect to the vehicle body sliding angle βb, and the partial differential of the yaw angular acceleration γ' with respect to the yaw rate γ. When the divergence ∇S is positive, the vectors have a tendency to point outwardly; and when this divergence ∇S is negative, the vectors have a tendency to point inwardly. Consequently, minimizing the divergence ∇S in the vector field S causes the vectors to point inwardly, thereby suppressing the divergence of the vehicle behavior.

In the present embodiment, based on the concept described above, the driving force distribution ratio r is controlled so as to minimize the divergence ∇S in the vector field S that represents the state surface. Note that in the present embodiment, the term "minimize the divergence ∇S" is used to mean not only to cause the value ∇S to have the smallest value in the possible range, but also to cause this value ∇S to have a value that is merely smaller than the current value. Calculating the divergence □S using the equations of state in Eqs. (35) and (36) leads to the following expression:

$$\nabla S = \frac{\partial \beta b'}{\partial \beta b} + \frac{\partial \gamma'}{\partial \gamma} = -2\left[\underbrace{\left(\frac{kf+kr}{M \cdot V} + \frac{lf^2 \cdot kf + lr^2 \cdot kr}{Iz \cdot V}\right)}_{Linear\ Term} - \right. \tag{48}$$

$$\left. \underbrace{\left\{\left(\frac{kf^2}{M \cdot V} + \frac{lf^2 \cdot kf^2}{Iz \cdot V}\right)\left(\frac{1}{Ff\_ymax}\right) \cdot |\beta f| + \left(\frac{kr^2}{M \cdot V} + \frac{lr^2 \cdot kr^2}{Iz \cdot V}\right)\left(\frac{1}{Fr\_ymax}\right) \cdot |\beta r|\right\}}_{Nonlinear\ Term} \right] =$$

$$-\frac{2}{M \cdot V} \cdot (kf\_a + Kr\_a) - \frac{2}{Iz \cdot V}(lf^2 \cdot kf\_a + lr^2 \cdot kr\_a) = (a11 + a22)$$

As shown in Eq. (48), the divergence □S of the vector field S is expressed as the sum of a linear term and a nonlinear term, as was the case in the first embodiment. Moreover, the divergence □S is equivalent to the negative of the sum of the diagonal elements of a11 and a22 in the system matrix. Because the linear term in the sum of the diagonal elements a11 and a12 is always positive, in order to minimize the divergence □S, the absolute value of the nonlinear term, which has a minus sign, should be minimized (that is, minimizing the nonlinear term).

The driving force distribution ratio r can be expressed as below by substituting Eq. (43) into the nonlinear term in Eq. (48):

$$\left(\frac{kf^2}{M \cdot V} + \frac{lf^2 \cdot kf^2}{Iz \cdot V}\right)\left(\frac{1}{\sqrt{\mu^2 \cdot Ff\_z^2 - r^2 \cdot \frac{Fa^2}{4}}}\right) \cdot |\beta f| + \tag{49}$$

$$\left(\frac{kr^2}{M \cdot V} + \frac{lr^2 \cdot kr^2}{Iz \cdot V}\right)\left(\frac{1}{\sqrt{\mu^2 \cdot Ff\_z^2 - (1-r)^2 \cdot \frac{Fa^2}{4}}}\right) \cdot |\beta r|$$

Specifically, values of the nonlinear term are calculated sequentially using the friction coefficient μ, the total driving force Fa, the front and rear wheel average vertical forces Ff_z and Fr_z, and the front and rear wheel average sliding angles βf and βr while varying the driving force distribution ratio r from 0.00 to 1.00 in a stepwise manner. The driving force distribution ratio r that yields the smallest of the calculated nonlinear term values is set as the target value r*. Note that when performing calculations sequentially in this way, it is difficult to measure accurately the values of the front and rear wheel average sliding angles βf and βr. Therefore, the sliding angles βf and βr may be replaced, respectively, with the front and rear wheel average lateral forces Ff_y and Fr_y, which are detectable, as was explained in the first embodiment.

In the present embodiment, the target value r* of the driving force distribution ratio r is determined so as to minimize the divergence □S of the vector field S that represents the state surface. Therefore, steering is improved, through controlling the vehicle responses (such as spinning, etc.) resulting from the nonlinear properties of the wheels.

In the present embodiment, the nonlinear term in the divergence □S is calculated, and the driving force distribution ratio r is determined so as to reduce the nonlinear term to be smaller than the current value. Note that minimizing the nonlinear term is equivalent to minimizing the divergence □S. Therefore, the series of control steps described above may be restated as the procedure described as follows: in the first step, the divergence □S is calculated in the calculating unit 80a; and in the second step, the driving force distribution ratio r that makes the divergence □S less than the current value is set in the setting unit 80b. Note that when the divergence □S is less than or equal to zero, the state surface has non-divergent tendencies; thus, it is possible to set as the target value r* a driving force distribution ratio value r that makes the divergence □S less than or equal to zero, rather than setting as the target value r* the driving force distribution ratio value r that minimizes the divergence □S. In other words, when there is a constraint that the current value □S be negative, a driving force distribution ratio value r that makes the divergence □S large may be selected as the target value r*.

In the individual embodiments so far, the vehicle body sliding angle βb and the yaw rate γ are used as the axes in the vector field for expressing the state surface, because of the use of the equations of state based on the two-wheel model. However, any parameters may be used as the axes, as long as they are state variables that express the state of motion of the vehicle, such as the lateral force Fz and the yaw moment, or the vehicle body sliding angle βb and the vehicle body sliding angular velocity βb'.

Sixth Embodiment

A vehicle wherein the state of motion is described with the equations of state based on a two-wheel model may be considered to be equivalent to an oscillator system with one degree of freedom, which is a time lag system of the second order. This oscillator system can be modeled as a free oscillator including damping, wherein the properties are expressed through two state variables, i.e. an angular eigen frequency $\omega n$, and a damping ratio $\zeta$. In the equations of state for the oscillator system with one degree of freedom, the angular eigen frequency $\omega n$ and the duty ratio $\zeta$ are expressed by the formulas below:

$$\omega n = \sqrt{-\frac{c}{m} \cdot 0 - \left(-\frac{k}{m} \cdot 1\right)} = \sqrt{\frac{k}{m}} \quad (50)$$

$$\zeta = \frac{c}{2 \cdot m} \cdot \frac{1}{\sqrt{\frac{k}{m}}} = \frac{c}{2\sqrt{m \cdot k}}$$

$$\omega n \cdot \zeta = -\frac{1}{2} \cdot \left(-\frac{c}{m} + 0\right) = \frac{c}{2m}$$

where m is a mass, c is a damping factor, and k is a spring constant. The angular eigen frequency $\omega n$ is the square root of the spring constant k divided by the mass m, and the damping ratio $\zeta$ is the damping factor c divided by twice the square root of the product of the mass m and the spring constant k.

The product of the angular eigen frequency $\omega n$ and the damping ratio $\zeta$ is a characteristic value representing the convergence of the oscillator system; thus, this product is mainly focused in the present embodiment (this product simply termed "damping" below). By taking into account the equivalence between the oscillator system and the motion of a vehicle (a vehicle system), and using the equations of state describing the state of motion of a vehicle (Eq. (35)), $\omega n$, $\zeta$, and $\omega n \cdot \zeta$ can be expressed as follows:

$$\omega n = \sqrt{a11 \cdot a22 - a12 \cdot a21} \quad (51)$$

$$\zeta = \frac{a11 + a22}{2 \cdot \sqrt{a11 \cdot a22 - a12 \cdot a21}}$$

$$\omega n \cdot \zeta = \frac{a11 + a22}{2}$$

As seen above, the angular eigen frequency $\omega n$ of the vehicle system is the square root of the difference between the product of the diagonal elements a11 and a22 and the product of the off-diagonal elements a12 and a21 in the system matrix, the damping factor $\zeta$ of the vehicle system is the sum of the diagonal elements a11 and a22 divided by a value that is twice the angular eigen frequency $\omega n$, and the damping $\omega n \cdot \zeta$ of the vehicle system is a value that is one half of the sum of the diagonal elements a11 and a22, or in other words, equal to the average of the diagonal elements a11 and a22. The larger the damping $\omega n \cdot \zeta$ is, the greater the convergence of the oscillator system to disturbances is. In other words, the larger the damping $\omega n \cdot \zeta$ is, the greater the stability of the vehicle is.

In the present embodiment, the driving force distribution ratio r is controlled so as to maximize the damping $\omega n \cdot \zeta$ based on the above concept. Note that in the present embodiment, the phrase "maximize the damping $\omega n \cdot \zeta$" is used to mean not only to cause the value of $\omega n \cdot \zeta$ to have the maximum value in the possible range, but also to cause the value of $\omega n \cdot \zeta$ to be merely larger than the current value (that is, to suppress any reductions in the damping $\omega n \cdot \zeta$). Because the linear term in the sum of the diagonal elements a11 and a22 is always positive, in order to maximize the damping $\omega n \cdot \zeta$, the absolute value of the nonlinear term, which has a minus sign, should be minimized (that is, minimizing the nonlinear term). The driving force distribution ratio r that minimizes the nonlinear term can be determined based on Eq. (49) as in the same manner as minimizing the divergence □S.

According to the present embodiment, the driving force distribution ratio r is determined so as to maximize the damping $\omega n \cdot \zeta$ to improve the convergence of the system, from the perspective of the equivalence between the state of motion of the vehicle and the oscillator system with one degree of freedom, which is a time lag system of the second order. Therefore, the stability and steering of the vehicle are improved.

Note that in the present embodiment, the driving force distribution ratio r was determined so as to make the nonlinear term less than the current value, and that minimizing the nonlinear term can be viewed as being equivalent to maximizing the damping $\omega n \cdot \zeta$. Therefore, the series of control steps described above may be restated as the procedure described as follows: in the first step, the damping $\omega n \cdot \zeta$ is calculated in the calculating unit 80a; and in the second step, the driving force distribution ratio r that makes the damping $\omega n \cdot \zeta$ less than the current value is set in the setting unit 80b.

Seventh Embodiment

Although in the second-seventh embodiments, a nonlinear term of one of the elements a11-a22 was minimized, nonlinear terms of two or more of the elements a11-a22 may be minimized. For example, the nonlinear terms of the sum of the elements a11 and a22 (the diagonal elements) may be minimized. The minimization of the nonlinear terms in the sum of the elements a11 and a22 can be done through the appropriate selection of the driving force distinction ratio r using Eq. (49). Such effects as shown, for example, in the fifth and sixth embodiments can be achieved by using a plurality of elements a11-a22, rather than only one of the elements a11-a22.

Eighth Embodiment

In the second-seventh embodiments, methods were presented whereby the driving force distribution ratio r for the front and rear wheels was controlled. The present invention is not limited thereto, but rather the driving force distribution ratio may be controlled for individual wheels (four wheels in the present embodiment) including the left and right wheels. The present eighth embodiment presents a case wherein the driving force distribution control is made for the individual wheels based on the control concept according to the fifth embodiment. Detailed explanations are omitted, however, since the basic concept is the same. For the sake of explanations, the notations showing the state variables are differentiated for individual wheels by using the letters "fl" to indicate the front left wheel, "fr" to indicate the front right wheel, "rl" to indicate the rear left wheel, and "rr" to indicate the rear right wheel. For example, kfl_a and kfr_a denote the cornering powers ka for the left and right front wheels, respectively, and krl_a and krr_a indicate the cornering powers ka for the left and right rear wheels, respectively (with the same convention holding for the other state variables as well).

The cornering power kf_a for the front wheels is the average of the cornering powers kfl_a and kfr_a for the left and right front wheels, and the cornering power kr_a for the rear wheels is the average of the cornering powers krl_a and krr_a for the left and right rear wheels. The cornering powers kfl_a through krr_a for the respective wheels can be calculated using Eq. (37), which is the equation for the per-wheel cornering power ka. By taking into account the four wheels individually in Eq. (38), the divergence □S is expressed as follows:

$$\nabla S = -2\left[\underbrace{\left(\frac{kf+kr}{M\cdot V} + \frac{lf^2\cdot kf + lr^2\cdot kr}{Iz\cdot V}\right)}_{\text{Linear Term}} - \underbrace{\left\{\left(\frac{kf^2}{M\cdot V} + \frac{lf^2\cdot kf^2}{Iz\cdot V}\right)\left(\frac{1}{2\text{Ffl\_ymax}} + \frac{1}{2\text{Ffr\_ymax}}\right)\cdot|\beta f| + \left(\frac{kr^2}{M\cdot V} + \frac{lr^2\cdot kr^2}{Iz\cdot V}\right)\left(\frac{1}{2\text{Frl\_ymax}} + \frac{1}{2\text{Frr\_ymax}}\right)\cdot|\beta r|\right\}}_{\text{Nonlinear Term}}\right] \quad (52)$$

where Ffl_ymax–Frr_ymax are the lateral force maximum values Fymax for the respective four wheels.

Here the driving force distribution ratio between the front and rear wheels (hereinafter termed "front/rear distribution ratio") is denoted by Rfr, the driving force distribution ratio between the left and right wheels in the front (hereinafter termed "front left/right distribution ratio") is denoted by Rlr_f, and the driving force distribution ratio between the left and right wheels in the rear (hereinafter termed "rear left/right distribution ratio") is denoted by Rlr_r. The longitudinal forces Ffl_x–Frr_x can be expressed in terms of the driving force distribution ratios Rfr–Rlr_r and the total driving force Fa as follows:

$$Ffl\_x = Rfr\cdot Rlr\_f\cdot Fa \; Ffr\_x = Rfr\cdot(1-Rlr\_f)\cdot Fa \; Frl\_x = (1-Rfr)\cdot Rlr\_r\cdot Fa \; Frr\_x = (1-Rfr)\cdot(1-Rlr\_r)\cdot Fa \quad (53)$$

In order to minimize the divergence □S, the absolute value of the nonlinear term, which has a minus sign, should be minimized (that is, minimizing the nonlinear term), In Eq. (52), the individual lateral force maximum values Ffl_ymax–Frr_ymax can be obtained using Eq. (40), which is the equation for calculating the per-wheel lateral force maximum value Fymax. Reorganizing the nonlinear term in Eq. (52) by use of Eq. (53), the nonlinear term that should be minimized with respect to the distribution ratios Rfr, Rlr_f and Rlr_r is expressed as follows:

$$\left(\frac{kf^2}{M\cdot V} + \frac{lf^2\cdot kf^2}{Iz\cdot V}\right)\left(\frac{1}{\sqrt{\mu fl^2\cdot Ffl\_z^2 - Rfr^2\cdot Rlr\_f^2\cdot Fa^2}} + \frac{1}{\sqrt{\mu fr^2\cdot Ffr\_z^2 - Rfr^2\cdot(1-Rlr\_f)^2\cdot Fa^2}}\right)|\beta f| + \left(\frac{kr^2}{M\cdot V} + \frac{lr^2\cdot kr^2}{Iz\cdot V}\right)\left(\frac{1}{\sqrt{\mu rl^2\cdot Frl\_z^2 - (1-Rfr)^2\cdot Rlr\_r^2\cdot Fa^2}} + \frac{1}{\sqrt{\mu rr^2\cdot Frr\_z^2 - (1-Rfr)^2\cdot(1-Rlr\_r)^2\cdot Fa^2}}\right)|\beta f| \quad (54)$$

Specifically, the values of the nonlinear term are calculated sequentially based on the friction coefficient μ, the total driving force Fa, the vertical forces Ffl_z–Frr_z, and the average sliding angles βf and βr, while varying each of the distribution ratios Rfr, Rlr_f and Rlr_r in a stepwise manner from 0.00 through 1.00. Thereafter, the combination of the distribution ratios Rfr, Rlr_f and Rlr_r that yields the smallest of the calculated nonlinear term values is selected, and those distribution ratios are set as the target values Rfr*, Rlr_f* and Rlr_r*. Note that in the above equations, the average front wheel sliding angle βf and the average rear wheel sliding angle βr may be replaced with the respective wheel lateral forces Ffl_y–Frr_y. In this case, the nonlinear term of the divergence □S is expressed as follows:

$$\left(\frac{kf}{M\cdot V} + \frac{lf^2\cdot kf}{Iz\cdot V}\right)\left(\frac{|Ffl\_y|}{\sqrt{\mu fl^2\cdot Ffl\_z^2 - Rfr^2\cdot Rlr\_f^2\cdot Fa^2}} + \frac{|Ffr\_y|}{\sqrt{\mu fr^2\cdot Ffr\_z^2 - Rfr^2\cdot(1-Rlr\_f)^2\cdot Fa^2}}\right) + \left(\frac{kr}{M\cdot V} + \frac{lr^2\cdot kr}{Iz\cdot V}\right)\left(\frac{|Frl\_y|}{\sqrt{\mu rl^2\cdot Frl\_z^2 - (1-Rfr)^2\cdot Rlr\_r^2\cdot Fa^2}} + \frac{|Frr\_y|}{\sqrt{\mu rr^2\cdot Frr\_z^2 - (1-Rfr)^2\cdot(1-Rlr\_r)^2\cdot Fa^2}}\right) \quad (55)$$

In the present embodiment, the driving force distribution ratios Rfr*, Rlr_f* and Rlr_r* are determined so as to minimize the divergence □S in the vector field that represents the surface of state of the vehicle motion. By distributing appropriately the driving force to the wheels, it is possible to achieve stable vehicle responses and thus improve steering. Note that setting the front left/right distribution ratio Rlr_f and the rear left/right distribution ratio Rlr_r to the constant value of 0.50 allows the distribution of the driving force equivalent to simply distributing the driving force between the front and rear wheels. Methods for distributing the driving force to the left and right wheels are described in, for example, Japanese Kokai Laid-open Publication 2001-168385. The entire disclosure of Japanese Kokai Laid-open Publication 2001-168385 is incorporated herein by reference.

Ninth Embodiment

In the embodiments described above, the nonlinear terms were minimized through adjusting the driving force distribution ratio for the wheels. However, because changes in the nonlinear terms are also caused by a load distribution ratio for the wheels, the nonlinear terms can be minimized through controlling the load distribution as well. Since the fundamental control concept is identical to that for controlling the driving force distribution, only the differences between the two approaches are described in the present embodiment.

Here, the total load, which is the sum of the load on each of the wheels, is denoted by W, and the load distribution ratio between the front and rear wheels is denoted by r'. Note that at this point, the addition of the apostrophe does not indicate a derivative, as it does in the previous embodiments. The average vertical force Ff_z for the front wheels and the average vertical force Fr_z for the rear wheels are given as follows:

$$W = 2(\text{Ff\_z} + \text{Fr\_z}) \quad (56)$$
$$\text{Ff\_z} = r' \cdot \frac{W}{2}$$
$$\text{Fr\_z} = (1 - r') \cdot \frac{W}{2}$$

The load distribution ratio r' that minimizes the nonlinear term in each of the elements a11 through a22 can be determined uniquely based on Eqs. (40), (41), and (56), through replacing Eq. (43), described in the second embodiment, with Eq. (56). For example, the nonlinear term in the element a11 is expressed as follows:

$$\frac{kf^2}{\sqrt{\mu^2 \cdot r'^2 \cdot \frac{W^2}{4} - \text{Ff\_x}^2}} \cdot |\beta f| + \frac{kr^2}{\sqrt{\mu^2 \cdot (1-r')^2 \cdot \frac{W^2}{4} - \text{Fr\_x}^2}} \cdot |\beta r| \quad (57)$$

where the total load W can be defined uniquely as the sum of the vertical forces (detected values) Fz for the individual wheels. The load distribution ratio r' that minimizes the nonlinear term can be obtained uniquely based on the average front and rear wheel sliding angles βf and βr, the friction coefficient μ, the total load W, and the average longitudinal forces Ff_x and Fr_x for the front and rear wheels.

Moreover, this type of load distribution control can be applied not only to the method described in the second embodiment, but also to the other embodiments as well. For example, in the fifth-seventh embodiments, the load distribution ratio r' that minimizes the nonlinear terms in the sum of the elements a11 and a22 can be calculated as in Eq. (58), which is obtained by substituting Eq. (56) into the nonlinear term in Eq. (48):

$$\left(\frac{kf^2}{M \cdot V} + \frac{lf^2 \cdot kf^2}{Iz \cdot V}\right)\left(\frac{1}{\sqrt{\mu^2 \cdot r^2 \cdot \frac{W^2}{4} - \text{Ff\_x}^2}}\right) \cdot |\beta f| + \quad (58)$$
$$\left(\frac{kr^2}{M \cdot V} + \frac{lr^2 \cdot kr^2}{Iz \cdot V}\right)\left(\frac{1}{\sqrt{\mu^2 \cdot (1-r)^2 \cdot \frac{W^2}{4} - \text{Fr\_x}^2}}\right) \cdot |\beta r|$$

As seen above, according to the present embodiment, the same effects as in the previous embodiments can be achieved, and the method of control is versatile enough to be applied to a broad variety of vehicles. Note that the load distribution to the individual wheels can be varied dynamically using electronically controlled suspension devices, for example.

The various embodiments described above dealt with four-wheel drive vehicles that use an engine as the driving power source, but an electric motor may be used as the driving power source instead. In such a case, the four wheels may all be driven by a single motor through a differential device in the same way as for the engine, or each wheel may be provided with a motor, or the front and rear wheels may be provided with respective motors. Even in these situations, the appropriate driving force distribution ratio r is obtained through controlling the differential of the differential device, or through controlling the power of the individual motors directly, by focusing on the nonlinear terms in the elements in the system matrix. The same effects as in the previous embodiments can be achieved in these situations as well. Moreover, for controlling during braking, power control of the engine, an antilock braking system, or the like, may be used depending on the driving force distribution ratio r.

Further, in the various embodiments described above, the detecting unit 81 was structured to detect the applied forces in three directions; however, the present invention is not limited thereto, but rather any detection system may be used insofar as it is able to detect the components of the applied forces in the required directions. Moreover, the directional components are not limited to three directions, but rather six-component force meters may be used to detect six components of a force, including the moments in three axes of rotation. Such structures pose, of course, no problem as long as they can detect, at least, the required applied forces. Note that a method for detecting the six components of the force that is applied to each of the wheels is described in, for example, Japanese Kokai Laid-open Publication 2002-039744 and Japanese Kokai Laid-open Publication 2002-022579. The entire disclosures of Japanese Kokai Laid-open Publications 2002-039744 and 2002-022579 are incorporated herein by reference.

A case wherein the detecting unit 81 is embedded in the axle 75 was described above, but the present invention is not limited thereto, and other variations can also be contemplated. From the perspective of detecting applied forces, the detecting unit 81 may be provided in, for example, a member that holds the wheels 76, such as a hub or a hub carrier, or the like. A method wherein the detecting unit is provided in a hub is described in Japanese Kokai Laid-open Publication 2003-104139. The entire disclosure of Japanese Kokai Laid-open Publication 2003-104139 is incorporated herein by reference.

In the embodiments presented, the longitudinal force Fx, lateral force Fy, and vertical force Fz were detected by sensors that detect directly the applied forces in three directions; however, the present invention is not limited thereto. For example, the lateral force Fy may be determined through estimating the cornering force (that is detectable), and the vertical force Fz may be determined through estimating the vertical load (that is detectable). In these estimating methods, wheel velocity sensors that detect the velocities of individual wheels, lateral acceleration sensors and longitudinal acceleration sensors that are provided at the center of gravity of the vehicle, and yaw rate sensors may be used.

The method for estimating the cornering force is explained below. As for the detection values obtained from the various sensors, the velocities of the individual wheels are denoted by Vfl_s, Vfr_s, Vrl_s, and Vrr_s, the yaw rate is denoted by y, the lateral acceleration is denoted by y"s, and the longitudinal acceleration is denoted by x"s. Moreover, the height of the center of gravity is denoted by h, the tread width is denoted by d, and the acceleration due to gravity is denoted by g.

These detected values are subjected to a digital filtering process for the purpose of eliminating noise due to road surface cant and vehicle body roll, in addition to low-frequency noise and high-frequency noise. The values detected by the wheel velocity sensors (wheel velocities), after the filtering processes, are denoted by Vfl_f, Vfr_f, Vrl_f, and Vrr_f, the vehicle velocity estimated based on these values (for example, the average value of the individual wheel velocities) is denoted by $\hat{V}$, and the vehicle acceleration obtained through taking the derivative of the vehicle speed $\hat{V}$ is denoted by $\hat{x''}$. Moreover, the output value from the yaw rate sensor (the yaw rate), after the filtering process, is denoted by $\gamma f$, and the yaw angular acceleration obtained through taking the derivative of the yaw rate $\gamma f$ is denoted by $\hat{\gamma'}$. The value outputted from the lateral acceleration sensor (the lateral acceleration), after the filtering process, is denoted by $\hat{y'''}$.

In the following, the left and right front wheel cornering forces are denoted by $\hat{Ffl}$ and $\hat{Ffr}$, and the left and right rear wheel cornering forces are denoted by $\hat{Frl}$ and $\hat{Frr}$. These values can be estimated using the equations of motion and the relationships below:

$$\hat{Ffl} = \hat{Ffr} = \frac{1}{2} \cdot \frac{lr \cdot M \cdot \hat{y''} + Iz \cdot \hat{\gamma'}}{lf + lr} \tag{59}$$

$$\hat{Frl} = \hat{Frr} = \frac{1}{2} \cdot \frac{lf \cdot M \cdot \hat{y''} - Iz \cdot \hat{\gamma'}}{lf + lr}$$

Consequently, the estimated value $\hat{Ff}$ for the average cornering force of the front wheels and the estimated value $\hat{Fr}$ for the average cornering force of the rear wheels can be calculated uniquely as follows:

$$\hat{Ff} = \frac{\hat{Ffl} + \hat{Ffr}}{2} = \frac{1}{2} \cdot \frac{lr \cdot M \cdot \hat{y''} + Iz \cdot \hat{\gamma'}}{lf + lr} \tag{60}$$

$$\hat{Fr} = \frac{\hat{Frl} + \hat{Frr}}{2} = \frac{1}{2} \cdot \frac{lf \cdot M \cdot \hat{y''} - Iz \cdot \hat{\gamma'}}{lf + lr}$$

If the cornering force acting on the vehicle body is denoted by Fc, the relationship between the cornering force Fc and the lateral force Fy acting on the wheels 76 satisfy the following relationship:

$$Fy = Fc \cdot \cos \delta f \tag{61}$$

Next, the method of estimating the vertical load is explained below. If the estimated values for the left and right front wheel vertical loads are denoted by $\hat{Wfl}$ and $\hat{Wfr}$, and the estimated values for the vertical loads on the left and right rear wheels are denoted by $\hat{Wrl}$ and $\hat{Wrr}$, these estimated values can be obtained as follows, ignoring the accelerating motion in the vertical direction and ignoring the accelerating motions around the roll and pitch axes of rotation:

$$\hat{Wfl} = \frac{1}{2} \cdot \frac{lr}{lf + lr} \cdot M \cdot g - \Delta Wlong - \Delta Wlat \tag{62}$$

$$\hat{Wfr} = \frac{1}{2} \cdot \frac{lr}{lf + lr} \cdot M \cdot g - \Delta Wlong + \Delta Wlat$$

$$\hat{Wrl} = \frac{1}{2} \cdot \frac{lf}{lf + lr} \cdot M \cdot g + \Delta Wlong - \Delta Wlat$$

$$\hat{Wrr} = \frac{1}{2} \cdot \frac{lf}{lf + lr} \cdot M \cdot g + \Delta Wlong + \Delta Wlat$$

Consequently, the estimated value $\hat{Ff}$ of the average cornering force for the front wheels and the estimated value $\hat{Fr}$ of the average cornering force for the rear wheels can be obtained as follows:

$$\hat{Wf} = \frac{\hat{Wfl} + \hat{Wfr}}{2} = \frac{1}{2} \cdot \frac{lr}{lf + lr} \cdot M \cdot g - \Delta Wlong \tag{63}$$

$$\hat{Wr} = \frac{\hat{Wrl} + \hat{Wrr}}{2} = \frac{1}{2} \cdot \frac{lf}{lf + lr} \cdot M \cdot g + \Delta Wlong$$

where $\Delta Wlong$ is the amount of shift of the load due to longitudinal acceleration, and $\Delta Wlat$ is the amount of shift of the load due to lateral acceleration. These individual values can be obtained as follows:

$$\Delta Wlong = \frac{1}{2} \cdot \frac{h}{lf + lr} \cdot M \cdot ax \tag{64}$$

$$\Delta Wlat = \frac{1}{2} \cdot \frac{h}{d} \cdot M \cdot ay$$

where ax is the longitudinal acceleration, which is the output value $\hat{x''s}$ from the longitudinal acceleration sensor or the vehicle body acceleration $\hat{x''}$ calculated based on the wheel velocity, and ay is the lateral acceleration, which is the output value $\hat{y'''}$ from the lateral acceleration sensor. Although in the calculations described above, the acceleration motions in the vertical direction on the springs and the rotational motion around the roll and pitch axes of rotation are ignored, the cornering force and the vertical load may be estimated taking these factors into account as well.

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

What is claimed is:

1. A vehicle motion control device for a vehicle, the vehicle having a plurality of wheels and a driving device for driving the wheels based on a driving force/load distribution ratio, comprising:

a calculating unit for obtaining, based on equations of state that describe a state of motion of the vehicle, a divergence value, which is a characteristic value that represents a tendency of vectors in a vector field, the vector field describing a state surface with axes representing state variables for the state of motion of the vehicle;

a setting unit for setting a target value of the driving force/load distribution ratio for the individual wheels, such that the divergence value becomes less than a current value of the divergence value or the divergence value becomes less than or equal to zero;

a driving device control unit for controlling the driving device based on the target driving force/load distribution ratio; and further comprising:

a detector unit for detecting a vertical force that acts on each of the wheels; and an estimating unit for estimating a sum of driving forces transmitted to the individual wheels to obtain an estimated total driving force, and estimating a friction coefficient between the wheels and a road surface to obtain an estimated friction coefficient; wherein the calculating unit obtains nonlinear terms in a polynomial that is a sum of diagonal elements of a system matrix for equations of state, the nonlinear terms comprising a sliding angle of the front wheels and a sliding angle of the rear wheels as variables, for each of the driving force distribution ratios, based on a group of parameters including the vertical force for each of the wheels, the estimated friction coefficient, and the estimated total driving force; and wherein the setting unit sets a target value of the driving force distribution ratio based on each of the nonlinear terms obtained in the calculating unit.

2. The vehicle motion control device according to claim 1, further comprising;

a detector unit for detecting a vertical force and a longitudinal force that act on each of the wheels; and an estimating unit for estimating a friction coefficient between the wheels and a road surface to obtain an estimated friction coefficient; wherein the calculating unit obtains nonlinear terms in a polynomial that is a sum of diagonal elements of a system matrix for equations of state, the nonlinear terms comprising a sliding angle of the front wheels and a sliding angle of the rear wheels as variables, for each of the load distribution ratios, based on a group of parameters including the vertical force and the longitudinal force for each of the wheels and the estimated friction coefficient; and wherein the setting unit sets a target value of the load distribution ratio based on each of the nonlinear terms.

3. A vehicle motion control method for controlling motion of a vehicle using a vehicle motion control device, the vehicle having a plurality of wheels and a driving device for driving the wheels based on a driving force/load distribution ratio, comprising:

a calculating step using a calculating unit within a microcomputer of the vehicle motion control device, for obtaining, based on equations of state that describe a state of motion of the vehicle, a divergence value, which is a characteristic value that represents a tendency of vectors in a vector field, the vector field describing a state surface with axes representing state variables for the state of motion of the vehicle;

a setting step using a setting unit within the microcomputer of the vehicle motion control device, for setting a target value of the driving force/load distribution ratio for the individual wheels, such that the divergence value becomes less than a current value of the divergence value or the divergence value becomes less than or equal to zero; and a driving device control step using a driving device control unit for controlling the driving device based on the target driving force/load distribution ratio; and further comprising:

a detecting step using a detecting unit within the vehicle motion control device for detecting a vertical force that acts on each of the wheels; and an estimating step using an estimating unit within the vehicle motion control device for estimating a sum of driving forces transmitted to the individual wheels to obtain an estimated total driving force, and estimating a friction coefficient between the wheels and a road surface to obtain an estimated friction coefficient; wherein the calculating step obtains nonlinear terms in a polynomial that is a sum of diagonal elements of a system matrix for equations of state, the nonlinear terms comprising a sliding angle of the front wheels and a sliding angle of the rear wheels as variables, for each of the driving force distribution ratios, based on a group of parameters including the vertical force for each of the wheels, the estimated friction coefficient, and the estimated total driving force; and wherein the setting step sets a target value of the driving force distribution ratio based on each of the nonlinear terms obtained in the calculating step.

* * * * *